(12) United States Patent
Gao et al.

(10) Patent No.: US 12,101,762 B2
(45) Date of Patent: Sep. 24, 2024

(54) INFORMATION TRANSMISSION METHOD, APPARATUS AND DEVICE

(71) Applicant: DATANG MOBILE COMMUNICATIONS EQUIPMENT CO., LTD., Beijing (CN)

(72) Inventors: Xuejuan Gao, Beijing (CN); Deshan Miao, Beijing (CN); Tony Ekpenyong, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 501 days.

(21) Appl. No.: 17/420,710

(22) PCT Filed: Dec. 27, 2019

(86) PCT No.: PCT/CN2019/129102
§ 371 (c)(1),
(2) Date: Jul. 5, 2021

(87) PCT Pub. No.: WO2020/140838
PCT Pub. Date: Jul. 9, 2020

(65) Prior Publication Data
US 2022/0070895 A1  Mar. 3, 2022

(30) Foreign Application Priority Data
Jan. 4, 2019  (CN) .......................... 201910009566.3

(51) Int. Cl.
*H04W 72/12* (2023.01)
*H04L 1/18* (2023.01)
(Continued)

(52) U.S. Cl.
CPC ....... *H04W 72/1268* (2013.01); *H04L 1/1812* (2013.01); *H04L 5/0051* (2013.01);
(Continued)

(58) Field of Classification Search
CPC ............. H04W 72/1268; H04W 72/23; H04W 72/046; H04W 72/21; H04W 76/30;
(Continued)

(56) References Cited

U.S. PATENT DOCUMENTS

| 2016/0338041 A1 | 11/2016 | Li et al. |
| 2018/0278401 A1 | 9/2018 | Ahn et al. |

(Continued)

FOREIGN PATENT DOCUMENTS

| CN | 102315916 A | 1/2012 |
| CN | 106301720 A | 1/2017 |

(Continued)

OTHER PUBLICATIONS

Supplementary European Search Report and European Search Opinion for European Patent Application No. 19907638.1, issued on Jan. 28, 2022.

(Continued)

*Primary Examiner* — Candal Elpenord
(74) *Attorney, Agent, or Firm* — Ladas & Parry, LLP

(57) ABSTRACT

An information transmission method, apparatus and device are provided. The method includes receiving downlink transmission; identifying a transmission reception point TRP or a TRP group corresponding to the downlink transmission; transmitting a Hybrid Automatic Repeat request Acknowledge HARQ-ACK of the downlink transmission to the TRP or the TRP group corresponding to the downlink transmission through a Physical Uplink Control Channel PUCCH, wherein, HARQ-ACKs of downlink transmissions corresponding to different TRPs or TRP groups are transmitted on different PUCCHs, and the different PUCCHs are PUCCHs using different PUCCH resources or are PUCCHs transmitted on non-overlapping symbols on a same carrier, or are PUCCHs transmitted on different carriers.

18 Claims, 4 Drawing Sheets

(51) Int. Cl.
  *H04L 1/1812* (2023.01)
  *H04L 5/00* (2006.01)
  *H04W 72/1268* (2023.01)
  *H04W 72/23* (2023.01)
  *H04W 76/30* (2018.01)

(52) U.S. Cl.
  CPC ........... *H04L 5/0053* (2013.01); *H04W 72/23* (2023.01); *H04W 76/30* (2018.02)

(58) Field of Classification Search
  CPC ... H04L 5/0051; H04L 5/0053; H04L 5/0094; H04L 5/0035; H04L 5/0055
  USPC .................................................. 370/329–330
  See application file for complete search history.

(56) References Cited

U.S. PATENT DOCUMENTS

| | | | |
|---|---|---|---|
| 2020/0015250 A1* | 1/2020 | Yang | H04L 5/001 |
| 2020/0059273 A1 | 2/2020 | Guo et al. | |
| 2020/0154467 A1* | 5/2020 | Gong | H04W 76/27 |
| 2021/0368496 A1* | 11/2021 | Li | H04W 72/21 |
| 2022/0029746 A1* | 1/2022 | Noh | H04B 7/024 |
| 2022/0046691 A1* | 2/2022 | Kim | H04L 1/1861 |

FOREIGN PATENT DOCUMENTS

| | | |
|---|---|---|
| CN | 109120372 A | 1/2019 |
| WO | 2018/141246 A1 | 8/2018 |
| WO | 2018/228487 A1 | 12/2018 |

OTHER PUBLICATIONS

"PUCCH resource allocation for HARQ-ACK and SR" 3GPP TSG RAN WGI Meeting #89 R1-1706960, Hangzhou, China, May 15-19, 2017 Agenda Item: 7.1.3.2.3 Source Huawei, HiSilicon.
"Enhancements on multi-TRP/panel transmission" 3GPP TSG RAN WG1 Meeting #94bis R1-1811348, Chengdu, China, Oct. 8-12, 2018 Agenda item: 7.2.8.2 Source: NTT Docomo, Inc.
Qualcomm Incorporated, "Enhancements on Multi-TRP/Panel Transmission", R1-1811277, 3GPP TSG-RAN WG1 Meeting #94bis, Chengdu, China, Oct. 8-12, 2018, all pages.
Intel Corporation, "Remaining details on NR PUCCH", R1-1812471, 3GPP TSG RAN WG1 Meeting #95, Spokane, USA, Nov. 12-16, 2018, all pages.
Qualcomm Incorporated, "Multi-TRP Enhancements", R1-1813442, 3GPP TSG-RAN WG1 Meeting #95, Spokane, WA, USA, Nov. 12-16, 2018, all pages.
First Office Action and search report from CN app. No. 201910009566.3, dated Jan. 4, 2021, with English translation from Global Dossier, all pages.
First Office Action and search report from TW app. No. 108148186, dated Dec. 30, 2020, with machine English translation, all pages.
International Search Report from PCT/CN2019/129102, dated Mar. 26, 2020, with English translation from WIPO, all pages.
Written Opinion of the International Searching Authority from PCT/CN2019/129102, dated Mar. 26, 2020, with English translation from WIPO, all pages.
International Preliminary Report on Patentability from PCT/CN2019/129102, dated Jun. 16, 2021, with English translation from WIPO, all pages.

* cited by examiner

INFORMATION TRANSMISSION METHOD, APPARATUS AND DEVICE

CROSS-REFERENCE TO RELATED APPLICATIONS

This application is a U.S. national phase application of a PCT Application No. PCT/CN2019/129102 filed on Dec. 27, 2019, which claims a priority to Chinese Patent Application No. 201910009566.3 filed on Jan. 4, 2019, the disclosures of which are incorporated in their entireties by reference herein.

TECHNICAL FIELD

The present disclosure relates to the field of communication technologies, in particular, relates to an information transmission method, an information transmission apparatus and a device.

BACKGROUND

In an R15 design of a new radio communication system (i.e., 5 Generation New RAT (5G NR)), a physical uplink control channel (PUCCH) includes several types of PUCCH formats 0/1/2/3/4. Uplink control information (UCI) includes an uplink scheduling request (SR), channel state information (CSI), a hybrid automatic repeat request-acknowledgement (HARQ-ACK), and the like. The SR may be configured to use PUCCH formats 0/1 for transmission, HARQ-ACK may be configured to use PUCCH formats 0/1/2/3/4 for transmission, and CSI may be configured to use PUCCH formats 2/3/4 for transmission. Different PUCCH formats correspond to different PUCCH resources.

Each PUCCH resource corresponds to one piece of spatial related information for determining a beam used for transmitting a UCI on the PUCCH resource, specifically, which spatial domain filter is used for transmission of the PUCCH. For example, whether to be consistent with a synchronization signal block (SSB)/a physical broadcast channel (PBCH), or to be consistent with a certain reference signal such as a channel state information reference signal (CSI-RS), a channel sounding reference signal (SRS), and the like. Subsequently, for convenience, spatial-domain related information of the PUCCH resource is simply referred to as beam information. The spatial-domain related information corresponding to each PUCCH resource may be pre-configured by a higher layer signaling, or may be obtained by indication through a higher layer signaling+a medium access control control element (MAC CE). For example, the higher layer signaling preconfigures a set of pieces of spatial-domain related information, which contains a plurality of pieces of spatial-domain related information, one spatial-domain related information is indicated to each PUCCH resource by the MAC CE.

In a scenario that transmission of different transmission reception points (TRP) is supported, beams for communications between different TRPs and a user equipment (UE) may be different. For example, TRP1 transmits a physical downlink shared channel (PDSCH) to a UE using beam 1, and TRP2 transmits a PDSCH to a UE using beam 2. The same is applied for an uplink direction. If different TRPs are ideal backhauls, and when the UE receiving PDSCHs from different TRPs, the UE may transmit HARQ-ACKs corresponding to the PDSCHs to the base station through one PUCCH, because one PUCCH resource corresponds to only one beam direction, The beam direction may only point to a certain TRP, that is, only one TRP among a plurality of TRPs may receive the HARQ-ACKs fed back by the UE, and then the received HARQ-ACKs may be shared to other TRPs through the ideal backhauls among TRPs, thereby enabling other TRPs to timely obtain feedback information of the PDSCHs transmitted by them. However, if a non-ideal backhaul exists among TRPs, information exchange between TRPs is not timely, and if the HARQ-ACKs corresponding to the PDSCHs from different TRPs are transmit on the same PUCCH, latency of information sharing through the non-ideal backhaul is significant. A TRP that does not directly receive the PUCCH cannot timely obtain the feedback information of the PDSCH transmitted by the TRP, thereby resulting in a significant subsequent scheduling and transmission latency. This latency is not acceptable for services that require a very short latency, such as an ultra-reliable low latency communications (URLLC).

SUMMARY

An objective of the present disclosure is to provide an information transmission method, an information transmission apparatus and a device, so as to solve the problem in the related art that independent information transmission for different TRPs cannot be achieved, causing that information transmission has a significant latency and service requirement cannot be met.

To achieve the above objective, the embodiments of the present disclosure provide an information transmission method. The information transmission method includes: receiving downlink transmission; identifying a transmission reception point (TRP) or a TRP group corresponding to the downlink transmission; transmitting a Hybrid Automatic Repeat request Acknowledge (HARQ-ACK) of the downlink transmission to the TRP or the TRP group corresponding to the downlink transmission through a Physical Uplink Control Channel (PUCCH), wherein, HARQ-ACKs of downlink transmissions corresponding to different TRPs or TRP groups are transmitted on different PUCCHs, and the different PUCCHs are PUCCHs using different PUCCH resources or are PUCCHs transmitted on non-overlapping symbols on a same carrier, or are PUCCHs transmitted on different carriers.

The downlink transmission includes at least one of following: a Physical Downlink Shared Channel (PDSCH), a Semi-Persistent Scheduling (SPS) PDSCH release, and a Physical Downlink Control Channel (PDCCH) indicating the SPS PDSCH release.

The PUCCH is transmitted using a beam corresponding to the TRP or the TRP group corresponding to the downlink transmission.

Identifying the TRP or the TRP group corresponding to the downlink transmission includes: identifying first information corresponding to the downlink transmission, wherein the first information includes at least one of following: a format of Downlink Control Information (DCI) for scheduling the downlink transmission, a size of the DCI for scheduling the downlink transmission, a Radio Network Temporary Identifier (RNTI) corresponding to the downlink transmission, a Control Resource Set (CORESET)/a search space/a monitoring occasion where the DCI for scheduling the downlink transmission is located, an indication field in the DCI for scheduling the downlink transmission, a beam/Demodulation Reference Signal (DMRS) port for the downlink transmission, and a beam/DMRS port for the DCI for scheduling the downlink transmission; and determining the TRP or the TRP group corresponding to the downlink transmission according to correspondence relationship between the first information and a TRP or a TRP group.

Transmitting the HARQ-ACK of the downlink transmission to the TRP or the TRP group corresponding to the downlink transmission through the PUCCH includes: determining multiple groups of PUCCH resource sets according to a received configuration signaling, wherein different groups of PUCCH resource sets correspond to different TRPs or TRP groups; determining, from a group of PUCCH resource sets corresponding to the TRP or the TRP group corresponding to the downlink transmission, the PUCCH resource for transmitting the HARQ-ACK of downlink transmission; transmitting the HARQ-ACK of the downlink transmission on the PUCCH resource.

Each group of PUCCH resource sets in the multiple groups of PUCCH resource sets includes at least one PUCCH resource set, and different PUCCH resource sets correspond to different numbers of Uplink Control Information (UCI) bits.

Determining, from the group of PUCCH resource sets corresponding to the TRP or the TRP group corresponding to the downlink transmission, the PUCCH resource for transmitting the HARQ-ACK of downlink transmission includes: if the group of PUCCH resource sets corresponding to the TRP or the TRP group corresponding to the downlink transmission includes only one PUCCH resource set, then according to the DCI corresponding to the downlink transmission, determining, in the PUCCH resource set, the PUCCH resource for transmitting the HARQ-ACK of the downlink transmission; if the group of PUCCH resource sets corresponding to the TRP or the TRP group corresponding to the downlink transmission includes at least two PUCCH resource sets, then selecting one PUCCH resource set according to the number of UCI bits to be fed back, and determining, in the selected one PUCCH resource set according to the DCI corresponding to the downlink transmission, the PUCCH resource for transmitting the HARQ-ACK of the downlink transmission.

Transmitting the HARQ-ACK of the downlink transmission to the TRP or the TRP group corresponding to the downlink transmission through the PUCCH includes: determining at least one PUCCH resource set according to a received configuration signaling, wherein the PUCCH resource set includes PUCCH resources corresponding to different TRPs or TRP groups; determining, from PUCCH resources corresponding to the TRP or the TRP group corresponding to the downlink transmission in the PUCCH resource set, the PUCCH resource for transmitting the HARQ-ACK of the downlink transmission; transmitting the HARQ-ACK of the downlink transmission on the PUCCH resource.

Determining, from the PUCCH resources corresponding to the TRP or the TRP group corresponding to the downlink transmission in the PUCCH resource set, the PUCCH resource for transmitting the HARQ-ACK of the downlink transmission includes: if the configuration signaling configures only one PUCCH resource set, then according to preset correspondence relationship between a TRP or a TRP group and a PUCCH resource in the one PUCCH resource set, determining, in the PUCCH resource set, one or more PUCCH resources corresponding to the TRP or the TRP group corresponding to the downlink transmission as candidate PUCCH resources, and according to the DCI corresponding to the downlink transmission, determining, from the candidate PUCCH resources, the PUCCH resource for transmitting the HARQ-ACK of the downlink transmission; if the configuration signaling configures at least two PUCCH resource sets, then selecting one PUCCH resource set according to the number of UCI bits to be fed back, and according to preset correspondence relationship between a TRP or a TRP group and a PUCCH resource in the selected one PUCCH resource set, determining, in the selected one PUCCH resource set, one or more PUCCH resources corresponding to the TRP or the TRP group corresponding to the downlink transmission as candidate PUCCH resources, and according to the DCI corresponding to the downlink transmission; determining, from the candidate PUCCH resources, the PUCCH resource for transmitting the HARQ-ACK of the downlink transmission.

PUCCH resources corresponding to different TRPs or TRP groups do not overlap in time domain.

The method further includes: if PUCCH resources corresponding to different TRPs or TRP groups overlap in time domain, then selecting one PUCCH for HARQ-ACK transmission based on a preset condition.

Before identifying the TRP or the TRP group corresponding to the downlink transmission, and transmitting the HARQ-ACK of the downlink transmission to the TRP or the TRP group corresponding to the downlink transmission through the PUCCH, the method further includes confirming that one of following conditions is satisfied: multiple TRPs are used for transmission; a non-ideal backhaul exists between TRPs or TRP groups; an indication signaling is received, wherein the indication signaling is used to indicate identifying the TRP or the TRP group corresponding to the downlink transmission.

To achieve the above objective, the embodiments of the present disclosure provide an information transmission method. The information transmission method includes: sending downlink transmission; receiving a Hybrid Automatic Repeat request Acknowledge (HARQ-ACK) of the downlink transmission through a Physical Uplink Control Channel (PUCCH) based on a transmission reception point (TRP) or a TRP group corresponding to the downlink transmission, wherein, HARQ-ACKs of downlink transmissions corresponding to different TRPs or TRP groups are transmitted on different PUCCHs, and the different PUCCHs are PUCCHs using different PUCCH resources or are PUCCHs transmitted on non-overlapping symbols on a same carrier, or are PUCCHs transmitted on different carriers.

The downlink transmission includes at least one of following: a Physical Downlink Shared Channel (PDSCH), a Semi-Persistent Scheduling (SPS) PDSCH release, and a Physical Downlink Control Channel (PDCCH) indicating the SPS PDSCH release.

The PUCCH is transmitted using a beam corresponding to the TRP or the TRP group corresponding to the downlink transmission.

Receiving the HARQ-ACK of the downlink transmission through the PUCCH based on the TRP or the TRP group corresponding to the downlink transmission includes: determining multiple groups of PUCCH resource sets according to a configuration signaling, wherein different groups of PUCCH resource sets correspond to different TRPs or TRP groups; determining, from a group of PUCCH resource sets corresponding to the TRP or the TRP group corresponding to the downlink transmission, the PUCCH resource for carrying the HARQ-ACK of downlink transmission; receiving the HARQ-ACK of the downlink transmission on the PUCCH resource.

Each group of PUCCH resource sets in the multiple groups of PUCCH resource sets includes at least one PUCCH resource set, and different PUCCH resource sets correspond to different numbers of Uplink Control Information (UCI) bits.

Determining, from the group of PUCCH resource sets corresponding to the TRP or the TRP group corresponding to the downlink transmission, the PUCCH resource for carrying the HARQ-ACK of downlink transmission includes: if the group of PUCCH resource sets corresponding to the TRP or the TRP group corresponding to the downlink transmission includes only one PUCCH resource set, then according to DCI corresponding to the downlink transmission, determining, in the PUCCH resource set, the PUCCH resource for carrying the HARQ-ACK of the downlink transmission; if the group of PUCCH resource sets corresponding to the TRP or the TRP group corresponding to the downlink transmission includes at least two PUCCH resource sets, then selecting one PUCCH resource set according to the number of UCI bits to be fed back, and determining, in the selected one PUCCH resource set according to DCI corresponding to the downlink transmission, the PUCCH resource for carrying the HARQ-ACK of the downlink transmission.

Receiving the HARQ-ACK of the downlink transmission through the PUCCH based on the TRP or the TRP group corresponding to the downlink transmission includes: determining at least one PUCCH resource set according to a configuration signaling, wherein the PUCCH resource set includes PUCCH resources corresponding to different TRPs or TRP groups; determining, from PUCCH resources corresponding to the TRP or the TRP group corresponding to the downlink transmission in the PUCCH resource set, the PUCCH resource for carrying the HARQ-ACK of the downlink transmission; receiving the HARQ-ACK of the downlink transmission on the PUCCH resource.

Determining, from the PUCCH resources corresponding to the TRP or the TRP group corresponding to the downlink transmission in the PUCCH resource set, the PUCCH resource for carrying the HARQ-ACK of the downlink transmission includes: if the configuration signaling configures only one PUCCH resource set, then according to preset correspondence relationship between a TRP or a TRP group and a PUCCH resource in the one PUCCH resource set, determining, in the PUCCH resource set, one or more PUCCH resources corresponding to the TRP or the TRP group corresponding to the downlink transmission as candidate PUCCH resources, and according to DCI corresponding to the downlink transmission, determining, from the candidate PUCCH resources, the PUCCH resource for carrying the HARQ-ACK of the downlink transmission; if the configuration signaling configures at least two PUCCH resource sets, then selecting one PUCCH resource set according to the number of UCI bits to be fed back, and according to preset correspondence relationship between a TRP or a TRP group and a PUCCH resource in the selected one PUCCH resource set, determining, in the selected one PUCCH resource set, one or more PUCCH resources corresponding to the TRP or the TRP group corresponding to the downlink transmission as candidate PUCCH resources, and according to the DCI corresponding to the downlink transmission; determining, from the candidate PUCCH resources, the PUCCH resource for carrying the HARQ-ACK of the downlink transmission.

PUCCH resources corresponding to different TRPs or TRP groups do not overlap in time domain.

The method further includes: if PUCCH resources corresponding to different TRPs or TRP groups overlap in time domain, then selecting one PUCCH for HARQ-ACK reception based on a preset condition.

Before receiving the HARQ-ACK of the downlink transmission through the PUCCH based on the TRP or the TRP group corresponding to the downlink transmission, the method further includes confirming that one of following conditions is satisfied: multiple TRPs are used for transmission; a non-ideal backhaul exists between TRPs or TRP groups; an indication signaling is sent, wherein the indication signaling is used to indicate identifying the TRP or the TRP group corresponding to the downlink transmission.

To achieve the above objective, the embodiments of the present disclosure provide a terminal. The terminal includes a transceiver, a storage, a processor and a computer program stored on the storage and executable by the processor, wherein the transceiver is configured to receive downlink transmission, the processor is configured to identify a transmission reception point (TRP) or a TRP group corresponding to the downlink transmission; the transceiver is further configured to transmit a Hybrid Automatic Repeat request Acknowledge (HARQ-ACK) of the downlink transmission to the TRP or the TRP group corresponding to the downlink transmission through a Physical Uplink Control Channel (PUCCH), wherein, HARQ-ACKs corresponding to downlink transmissions of different TRPs or TRP groups are transmitted on different PUCCHs; different PUCCHs are PUCCHs using different PUCCH resources or PUCCHs transmitted on non-overlapping symbols on the same carrier, or PUCCHs transmitted on different carriers.

The downlink transmission includes at least one of following: a Physical Downlink Shared Channel (PDSCH), a Semi-Persistent Scheduling (SPS) PDSCH release, and a Physical Downlink Control Channel (PDCCH) indicating the SPS PDSCH release.

The PUCCH is transmitted using a beam corresponding to the TRP or the TRP group corresponding to the downlink transmission.

The processor is further configured to: identify first information corresponding to the downlink transmission, wherein the first information includes at least one of following: a format of Downlink Control Information (DCI) for scheduling the downlink transmission, a size of the DCI for scheduling the downlink transmission, a Radio Network Temporary Identifier (RNTI) corresponding to the downlink transmission, a Control Resource Set (CORESET)/a search space/a monitoring occasion where the DCI for scheduling the downlink transmission is located, an indication field in the DCI for scheduling the downlink transmission, a beam/Demodulation Reference Signal (DMRS) port for the downlink transmission, and a beam/DMRS port for the DCI for scheduling the downlink transmission; and determine the TRP or the TRP group corresponding to the downlink transmission according to correspondence relationship between the first information and a TRP or a TRP group.

The processor is further configured to: determine multiple groups of PUCCH resource sets according to a received configuration signaling, wherein different groups of PUCCH resource sets correspond to different TRPs or TRP groups; determine, from a group of PUCCH resource sets corresponding to the TRP or the TRP group corresponding to the downlink transmission, the PUCCH resource for transmitting the HARQ-ACK of downlink transmission; the transceiver is further configured to transmit the HARQ-ACK of the downlink transmission on the PUCCH resource.

Each group of PUCCH resource sets in the multiple groups of PUCCH resource sets includes at least one PUCCH resource set, and different PUCCH resource sets correspond to different numbers of Uplink Control Information (UCI) bits.

The processor is further configured to: if the group of PUCCH resource sets corresponding to the TRP or the TRP group corresponding to the downlink transmission includes only one PUCCH resource set, then according to the DCI corresponding to the downlink transmission, determine, in the PUCCH resource set, the PUCCH resource for transmitting the HARQ-ACK of the downlink transmission; if the group of PUCCH resource sets corresponding to the TRP or the TRP group corresponding to the downlink transmission includes at least two PUCCH resource sets, then select one PUCCH resource set according to the number of UCI bits to be fed back, and determine, in the selected one PUCCH resource set according to the DCI corresponding to the downlink transmission, the PUCCH resource for transmitting the HARQ-ACK of the downlink transmission.

The processor is further configured to: determine at least one PUCCH resource set according to a received configuration signaling, wherein the PUCCH resource set includes PUCCH resources corresponding to different TRPs or TRP groups; determine, from PUCCH resources corresponding to the TRP or the TRP group corresponding to the downlink transmission in the PUCCH resource set, the PUCCH resource for transmitting the HARQ-ACK of the downlink transmission; the transceiver is further configured to transmit the HARQ-ACK of the downlink transmission on the PUCCH resource.

The processor is further configured to: if the configuration signaling configures only one PUCCH resource set, then according to preset correspondence relationship between a TRP or a TRP group and a PUCCH resource in the one PUCCH resource set, determine, in the PUCCH resource set, one or more PUCCH resources corresponding to the TRP or the TRP group corresponding to the downlink transmission as candidate PUCCH resources, and according to the DCI corresponding to the downlink transmission, determine, from the candidate PUCCH resources, the PUCCH resource for transmitting the HARQ-ACK of the downlink transmission; if the configuration signaling configures at least two PUCCH resource sets, then select one PUCCH resource set according to the number of UCI bits to be fed back, and according to preset correspondence relationship between a TRP or a TRP group and a PUCCH resource in the selected one PUCCH resource set, determine, in the selected one PUCCH resource set, one or more PUCCH resources corresponding to the TRP or the TRP group corresponding to the downlink transmission as candidate PUCCH resources, and according to the DCI corresponding to the downlink transmission; determine, from the candidate PUCCH resources, the PUCCH resource for transmitting the HARQ-ACK of the downlink transmission.

PUCCH resources corresponding to different TRPs or TRP groups do not overlap in time domain.

The processor is further configured to: if PUCCH resources corresponding to different TRPs or TRP groups overlap in time domain, then select a PUCCH for HARQ-ACK transmission based on a preset condition.

The processor is further configured to confirm that one of following conditions is satisfied: multiple TRPs are used for transmission; a non-ideal backhaul exists between TRPs or TRP groups; an indication signaling is received, wherein the indication signaling is used to indicate identifying the TRP or the TRP group corresponding to the downlink transmission.

To achieve the above objective, the embodiments of the present disclosure provide a network device. The network device includes a transceiver, a storage, a processor and a computer program stored on the storage and executable by the processor; the transceiver is configured to: send downlink transmission; receive a Hybrid Automatic Repeat request Acknowledge (HARQ-ACK) of the downlink transmission through a Physical Uplink Control Channel (PUCCH) based on a transmission reception point (TRP) or a TRP group corresponding to the downlink transmission, wherein, HARQ-ACKs of downlink transmissions corresponding to different TRPs or TRP groups are transmitted on different PUCCHs, and the different PUCCHs are PUCCHs using different PUCCH resources or are PUCCHs transmitted on non-overlapping symbols on a same carrier, or are PUCCHs transmitted on different carriers.

The downlink transmission includes at least one of following: a Physical Downlink Shared Channel (PDSCH), a Semi-Persistent Scheduling (SPS) PDSCH release, and a Physical Downlink Control Channel (PDCCH) indicating the SPS PDSCH release.

The PUCCH is transmitted using a beam corresponding to the TRP or the TRP group corresponding to the downlink transmission.

The processor is further configured to: determine multiple groups of PUCCH resource sets according to a configuration signaling, wherein different groups of PUCCH resource sets correspond to different TRPs or TRP groups; determine, from a group of PUCCH resource sets corresponding to the TRP or the TRP group corresponding to the downlink transmission, the PUCCH resource for carrying the HARQ-ACK of downlink transmission; the transceiver is further configured to receive the HARQ-ACK of the downlink transmission on the PUCCH resource.

Each group of PUCCH resource sets in the multiple groups of PUCCH resource sets includes at least one PUCCH resource set, and different PUCCH resource sets correspond to different numbers of Uplink Control Information (UCI) bits.

The processor is further configured to: if the group of PUCCH resource sets corresponding to the TRP or the TRP group corresponding to the downlink transmission includes only one PUCCH resource set, then according to DCI corresponding to the downlink transmission, determine, in the PUCCH resource set, the PUCCH resource for carrying the HARQ-ACK of the downlink transmission; if the group of PUCCH resource sets corresponding to the TRP or the TRP group corresponding to the downlink transmission includes at least two PUCCH resource sets, then select one PUCCH resource set according to the number of UCI bits to be fed back, and determine, in the selected one PUCCH resource set according to DCI corresponding to the downlink transmission, the PUCCH resource for carrying the HARQ-ACK of the downlink transmission.

The processor is further configured to: determine at least one PUCCH resource set according to a configuration signaling, wherein the PUCCH resource set includes PUCCH resources corresponding to different TRPs or TRP groups; determine, from PUCCH resources corresponding to the TRP or the TRP group corresponding to the downlink transmission in the PUCCH resource set, the PUCCH resource for carrying the HARQ-ACK of the downlink transmission; the transceiver is further configured to receive the HARQ-ACK of the downlink transmission on the PUCCH resource.

The processor is further configured to: if the configuration signaling configures only one PUCCH resource set, then according to preset correspondence relationship between a TRP or a TRP group and a PUCCH resource in the one PUCCH resource set, determine, in the PUCCH resource set, one or more PUCCH resources corresponding to the TRP or the TRP group corresponding to the downlink transmission as candidate PUCCH resources, and according to DCI corresponding to the downlink transmission, determine, from the candidate PUCCH resources, the PUCCH resource for carrying the HARQ-ACK of the downlink transmission; if the configuration signaling configures at least two PUCCH resource sets, then select one PUCCH resource set according to the number of UCI bits to be fed back, and according to preset correspondence relationship between a TRP or a TRP group and a PUCCH resource in the selected one PUCCH resource set, determine, in the selected one PUCCH resource set, one or more PUCCH resources corresponding to the TRP or the TRP group corresponding to the downlink transmission as candidate PUCCH resources, and according to the DCI corresponding to the downlink transmission; determine, from the candidate PUCCH resources, the PUCCH resource for carrying the HARQ-ACK of the downlink transmission.

PUCCH resources corresponding to different TRPs or TRP groups do not overlap in time domain.

The processor is further configured to: if PUCCH resources corresponding to different TRPs or TRP groups overlap in time domain, then select one PUCCH for HARQ-ACK reception based on a preset condition.

The processor is further configured to confirm that one of following conditions is satisfied: multiple TRPs are used for transmission; a non-ideal backhaul exists between TRPs or TRP groups; an indication signaling is sent, wherein the indication signaling is used to indicate identifying the TRP or the TRP group corresponding to the downlink transmission.

To achieve the above objective, the embodiments of the present disclosure provide an information transmission apparatus. The information transmission device includes: a first receiving module, configured to receive downlink transmission; a processing module, configured to identify a transmission reception point (TRP) or a TRP group corresponding to the downlink transmission; a first sending module, configured to transmit a Hybrid Automatic Repeat request Acknowledge (HARQ-ACK) of the downlink transmission to the TRP or the TRP group corresponding to the downlink transmission through a Physical Uplink Control Channel (PUCCH), wherein, HARQ-ACKs of downlink transmissions corresponding to different TRPs or TRP groups are transmitted on different PUCCHs, and the different PUCCHs are PUCCHs using different PUCCH resources or are PUCCHs transmitted on non-overlapping symbols on a same carrier, or are PUCCHs transmitted on different carriers.

To achieve the above objective, the embodiments of the present disclosure provide an information transmission apparatus. The information transmission device includes: a second sending module, configured to send downlink transmission; a second receiving module, configured to receive a Hybrid Automatic Repeat request Acknowledge (HARQ-ACK) of the downlink transmission through a Physical Uplink Control Channel (PUCCH) based on a transmission reception point (TRP) or a TRP group corresponding to the downlink transmission, wherein HARQ-ACKs of downlink transmissions corresponding to different TRPs or TRP groups are transmitted on different PUCCHs, and the different PUCCHs are PUCCHs using different PUCCH resources or are PUCCHs transmitted on non-overlapping symbols on a same carrier, or are PUCCHs transmitted on different carriers.

To achieve the above objective, the embodiments of the present disclosure provide a computer-readable storage medium, which includes a computer program stored on the computer-readable storage medium, wherein when the computer program is executed by a processor, the processor implements the steps in the information transmission method applied to a terminal.

To achieve the above objective, the embodiments of the present disclosure provide a computer-readable storage medium, which includes a computer program stored on the computer-readable storage medium, wherein when the computer program is executed by a processor, the processor implements the steps in the information transmission method applied to a network device.

The beneficial effects of the above technical solutions of the present disclosure are as follow.

The information transmission methods according to the embodiments of the present disclosure may identify the TRPs or the TRP groups corresponding to the downlink transmissions by receiving the downlink transmissions from the base station, and transmit HARQ-ACKs of downlink transmissions corresponding to different TRPs or TRP groups on different PUCCHs, wherein different PUCCHs are PUCCHs using different PUCCH resources or are PUCCHs transmitted on non-overlapping symbols on the same carrier, or are PUCCHs transmitted on different carriers. In this way, it realizes independent information transmission for different TRPs, avoids the information transmission latency, and meets service requirement.

DETAILED DESCRIPTION

In order to make clearer the technical problems, technical solutions and advantages to be solved by the present disclosure, a detailed description will be given below with reference to drawings and specific embodiments.

The present disclosure provides an information transmission method for the problems in the related art that information transmission latency occurs due to inability of transmitting information independently for different TRPs and service requirements cannot be satisfied, and the information transmission method may achieve independent information transmission for different TRPs.

Figure 1:
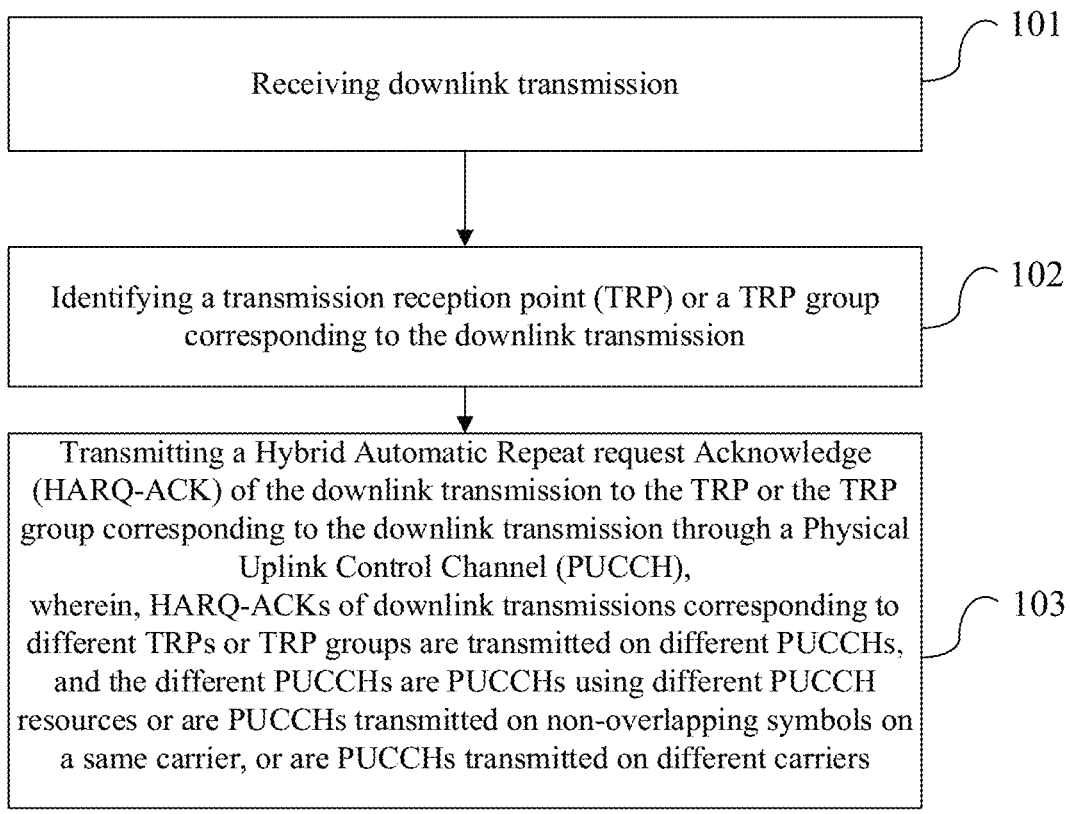
FIG. 1 is a first flowchart of an information transmission method applied to a terminal according to an embodiment of the present disclosure.

As shown in FIG. 1, an information transmission method according to an embodiment of the present disclosure includes steps 101-103.

Step 101: receiving downlink transmission.

Step 102: identifying a transmission reception point (TRP) or a TRP group corresponding to the downlink transmission.

Step 103: transmitting a Hybrid Automatic Repeat request Acknowledge (HARQ-ACK) of the downlink transmission to the TRP or the TRP group corresponding to the downlink transmission through a Physical Uplink Control Channel (PUCCH), wherein, HARQ-ACKs of downlink transmissions corresponding to different TRPs or TRP groups are transmitted on different PUCCHs, and the different PUCCHs are PUCCHs using different PUCCH resources or are PUCCHs transmitted on non-overlapping symbols on a same carrier, or are PUCCHs transmitted on different carriers.

According to the above steps 101-103, the terminal to which the information transmission method according to the embodiment of the present disclosure is applied can identify the TRPs or the TRP groups corresponding to the downlink transmissions by receiving the downlink transmissions from the base station, and transmits HARQ-ACKs of downlink transmissions corresponding to different TRPs or TRP groups on different PUCCHs, wherein different PUCCHs are PUCCHs using different PUCCH resources or are PUCCHs transmitted on non-overlapping symbols on the same carrier, or are PUCCHs transmitted on different carriers. In this way, it realizes independent information transmission for different TRPs, avoids the information transmission latency, and meets service requirement.

Figure 2:
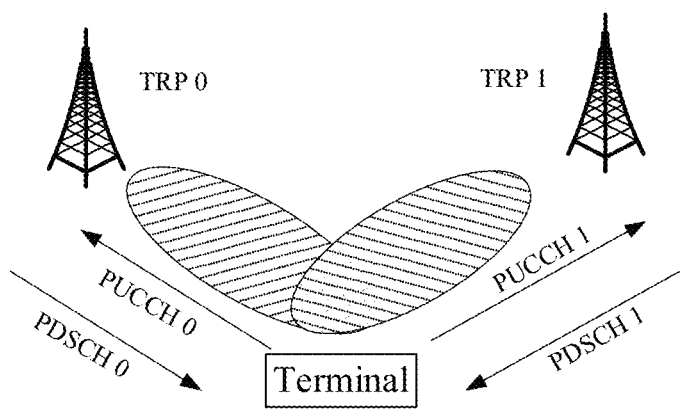
FIG. 2 illustrates PUCCH resource indication under multiple TRPs.

As shown in FIG. 2, the terminal to which the information transmission method according to the embodiment of the present disclosure is applied can perform independent information transmissions for a TRP0 and a TRP1, and the information transmission latency is avoided.

The PUCCH is transmitted using a beam corresponding to the TRP or the TRP group corresponding to the downlink transmission.

Here, beams for different PUCCHs may be different, and of course it is not excluded to use the same beam, for example, if beam directions between different TRPs and a terminal are the same, then beams for different PUCCHs are the same.

In addition, optionally, the downlink transmission includes at least one of the following: a Physical downlink shared channel (PDSCH), a Semi-Persistent Scheduling (SPS) PDSCH release, and a PDCCH indicating the SPS PDSCH release.

In this embodiment, for the received downlink transmission, in order to identify the TRP or the TRP group corresponding to the downlink transmission, optionally, step 102 includes: identifying first information corresponding to the downlink transmission, wherein the first information includes at least one of following: a format of downlink control information (DCI) for scheduling the downlink transmission, a size of the DCI for scheduling the downlink transmission, a Radio Network Temporary Identifier (RNTI) corresponding to the downlink transmission, a control resource set (CORESET)/a search space/a monitoring occasion where the DCI for scheduling the downlink transmission is located, an indication field in the DCI for scheduling the downlink transmission, a beam/Demodulation Reference Signal (DMRS) port for the downlink transmission, and a beam/DMRS port for the DCI for scheduling the downlink transmission; and determining the TRP or the TRP group corresponding to the downlink transmission according to correspondence relationship between the first information and a TRP or a TRP group.

In this way, if a plurality of downlink transmissions is received, it is possible to determine whether the plurality of downlink transmissions correspond to the same TRP or TRP group according to whether the first information corresponding to the plurality of downlink transmissions is the same or belongs to the same type. Therefore, different PUCCHs are used for transmitting the HARQ-ACKs of downlink transmissions for different TRPs or TRP groups. The correspondence relationship between the first information and the TRP or the TRP group is predetermined or configured.

For example, two downlink transmissions, i.e., downlink transmission 1 and downlink transmission 2, are received. If a format of DCI for scheduling the downlink transmission 1 is a format 0, a format of DCI for scheduling the downlink transmission 2 is a format 1, then by classifying the DCI format 0 and the DCI format 1 as a same type, the downlink transmission 1 and the downlink transmission 2 correspond to one TRP or TRP group, or by classifying the DCI format 0 and the DCI format 1 as different type, the downlink transmission 1 and the downlink transmission 2 correspond to different TRPs or TRP groups, respectively.

Optionally, two downlink transmissions, i.e., downlink transmission 1 and downlink transmission 2, are received. If a size of a DCI format for scheduling the downlink transmission 1 is A1, and a size of a DCI format for scheduling the downlink transmission 2 is A2, then by classifying A1 and A2 as one type, the downlink transmission 1 and the downlink transmission 2 correspond to one TRP or one TRP group; or if classifying A1 and A2 as different types, the downlink transmission 1 and the downlink transmission 2 correspond to different TRPs or TRP groups, respectively.

Optionally, two TRPs operate on the same carrier in a system, TRP1 corresponds to CORESET1, and TRP2 corresponds to CORESET2. The terminal can determine, by determining CORESET in which DCI is detected, the DCI and which TRP corresponds to the downlink transmission scheduled by the DCI, and further it is possible to determine that a corresponding HARQ-ACK is transmitted on the corresponding PUCCH.

The TRP or the TRP group may also be directly expressed as a DCI format for downlink transmission, a DCI size for scheduling downlink transmission, an RNTI corresponding to downlink transmission, and a CORESET/a search space/a monitoring occasion where DCI for scheduling downlink transmission is located, an indication field in DCI for scheduling downlink transmission, a beam/DMRS port for downlink transmission, and a beam/DMRS port for DCI for scheduling downlink transmission, etc. That is, different pieces of above information represent different TRPs or TRP groups.

Figure 3:
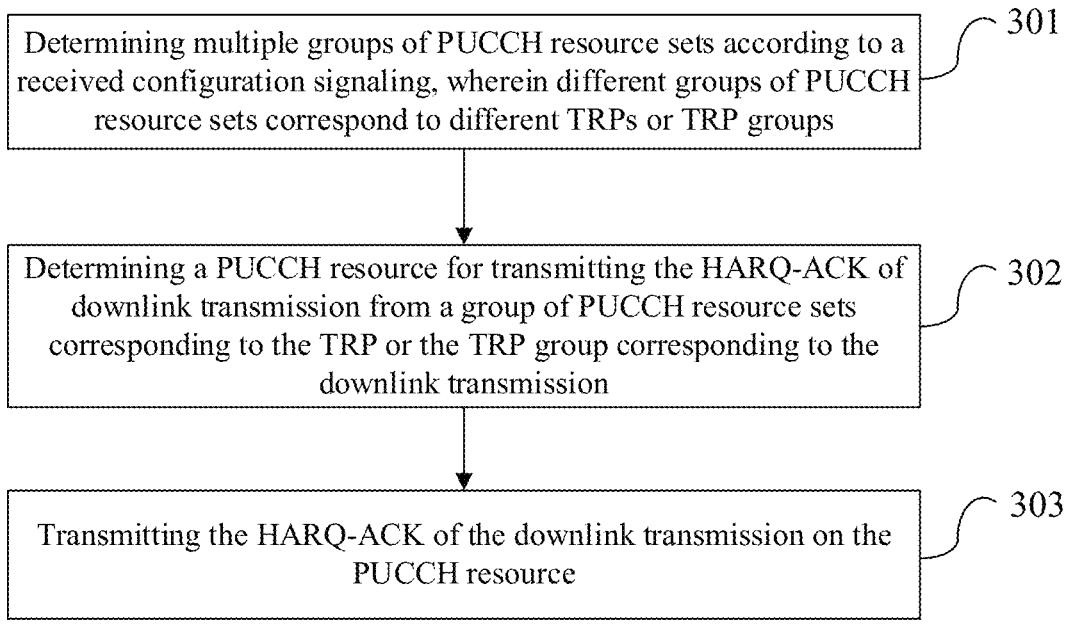
FIG. 3 is a second flowchart of an information transmission method applied to a terminal according to an embodiment of the present disclosure.

In addition, in this embodiment, on one hand, optionally, as shown in FIG. 3, step 103 includes steps 301-303.

Step 301: determining multiple groups of PUCCH resource sets according to a received configuration signaling, wherein different groups of PUCCH resource sets correspond to different TRPs or TRP groups.

Step 302: determining a PUCCH resource for transmitting the HARQ-ACK of downlink transmission from a group of PUCCH resource sets corresponding to the TRP or the TRP group corresponding to the downlink transmission.

Step 303: transmitting the HARQ-ACK of the downlink transmission on the PUCCH resource.

Here, correspondence relationship between a TRP or TRP group and groups of PUCCH resource sets is predetermined or configured. Thus, in steps 301-303, the terminal, which applies the method embodiment, first receives a configuration instruction, and according to the received configuration instruction, determines configured groups of PUCCH resource sets, and then further determines a PUCCH resource, for transmitting HARQ-ACK of the downlink transmission, in a group of PUCCH resource sets corresponding to the TRP or the TRP group corresponding to the received downlink transmission, and transmits the HARQ-ACK on the PUCCH resource.

Each group of PUCCH resource sets in the multiple groups of PUCCH resource sets includes at least one PUCCH resource set, and different PUCCH resource sets correspond to different numbers of uplink control information (UCI) bits.

Optionally, step 302 includes: if a group of PUCCH resource sets corresponding to the TRP or the TRP group corresponding to the downlink transmission includes only one PUCCH resource set, then according to the DCI corresponding to the downlink transmission, determining, in the PUCCH resource set, the PUCCH resource for transmitting the HARQ-ACK of the downlink transmission; if a group of PUCCH resource sets corresponding to the TRP or the TRP group corresponding to the downlink transmission includes at least two PUCCH resource sets, then selecting one PUCCH resource set according to the number of UCI bits to be fed back, and determining, according to the DCI corresponding to the downlink transmission, the PUCCH resource for transmitting the HARQ-ACK of the downlink transmission in the selected one PUCCH resource set.

For example, it is identified that the received downlink transmission 1 corresponds to TRP1, and the downlink transmission 2 corresponds to TRP2, and the configuration signaling configures two groups of PUCCH resource sets: Group A of PUCCH resource sets (including only one PUCCH resource set, that is, PUCCH resource set 1) and Group B of PUCCH resource sets (including PUCCH resource set 1 and PUCCH resource set 2), wherein the Group A of PUCCH resource sets corresponds to TRP1 and the Group B of PUCCH resource sets corresponds to TRP2. Therefore, for HARQ-ACK of downlink transmission 1, according to the DCI corresponding to the downlink transmission 1, one PUCCH resource in the PUCCH resource set 1 in the Group A of PUCCH resource sets is determined for transmitting the HARQ-ACK, according to a PUCCH resource indication field in the DCI; for the HARQ-ACK corresponding to downlink transmission 2, firstly, a PUCCH resource set, such as PUCCH resource set 2, is selected according to the number of UCI bits to be fed back, and then according to DCI corresponding to downlink transmission 2, one PUCCH resource in the PUCCH resource set 2 is determined for transmitting the HARQ-ACK, according to the PUCCH resource indication field in the DCI.

Figure 4:
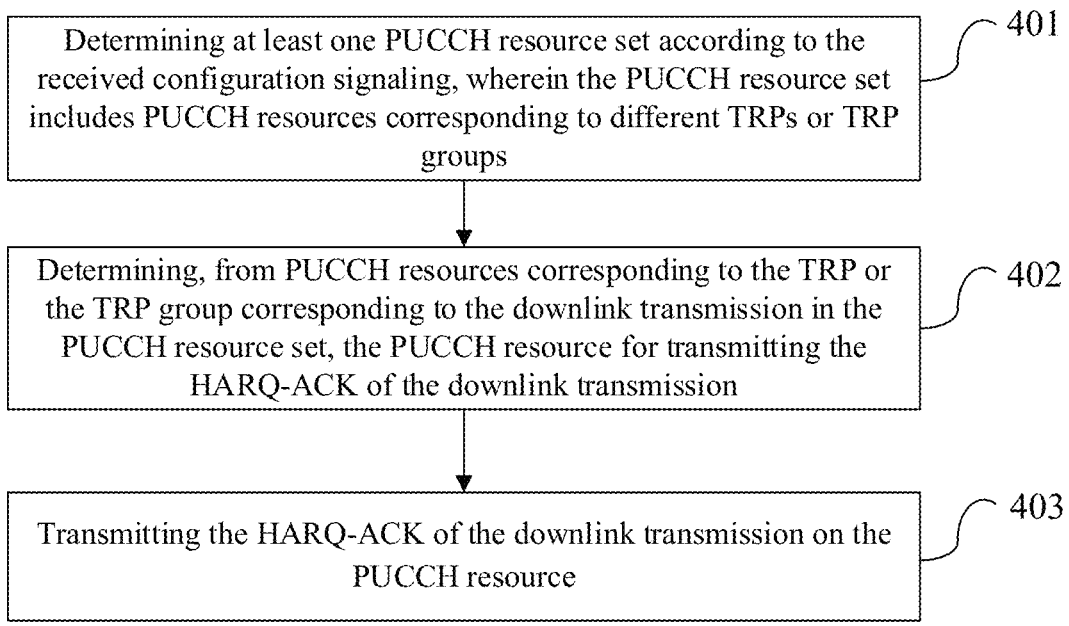
FIG. 4 is a third flowchart of an information transmission method applied to a terminal according to an embodiment of the present disclosure.

Optionally, as shown in FIG. 4, step 103 includes steps 401-403.

Step 401: determining at least one PUCCH resource set according to the received configuration signaling, wherein the PUCCH resource set includes PUCCH resources corresponding to different TRPs or TRP groups.

Step 402: determining, from PUCCH resources corresponding to the TRP or the TRP group corresponding to the downlink transmission in the PUCCH resource set, the PUCCH resource for transmitting the HARQ-ACK of the downlink transmission.

Step 403: transmitting the HARQ-ACK of the downlink transmission on the PUCCH resource.

Here, the correspondence relationship between a TRP or a TRP group and a PUCCH resource is predetermined or preset. In this way, in steps 401-403, the terminal, which applies the method embodiment, first receives a configuration instruction, then according to the received configuration instruction, determines at least one configured PUCCH resource set, and then from a PUCCH resource, in the PUCCH resource set, corresponding to a TRP or a TRP group corresponding to the received downlink transmission, the terminal determines the PUCCH resource for transmitting the HARQ-ACK of the downlink transmission, and transmits the HARQ-ACK on the PUCCH resource.

Optionally, step 402 includes: if the configuration signaling configures only one PUCCH resource set, then according to the preset correspondence relationship between a TRP or a TRP group and a PUCCH resource in the one PUCCH resource set, determining, in the PUCCH resource set, one or more PUCCH resources corresponding to a TRP or a TRP group corresponding to the downlink transmission as candidate PUCCH resources, and according to the DCI corresponding to the downlink transmission, determining, from the candidate PUCCH resources, a PUCCH resource for transmitting the HARQ-ACK of the downlink transmission; if the configuration signaling configures at least two PUCCH resource sets, then selecting one PUCCH resource set according to the number of UCI bits to be fed back, and according to the preset correspondence relationship between a TRP or a TRP group and a PUCCH resource in the selected one PUCCH resource set, determining, in the selected one PUCCH resource set, one or more PUCCH resources corresponding to a TRP or a TRP group corresponding to the downlink transmission as candidate PUCCH resources, and according to the DCI corresponding to the downlink transmission; determining, from the candidate PUCCH resources, a PUCCH resource for transmitting the HARQ-ACK of the downlink transmission.

For example, it is identified that the received downlink transmission 1 corresponds to TRP1 and the downlink transmission 2 corresponds to TRP2. It is assumed that the configuration signaling configures only one PUCCH resource set, i.e., a PUCCH resource set C (including PUCCH resource 1, PUCCH resource 2, PUCCH resource 3 and PUCCH resource 4), first, according to the preset correspondence relationship between the TRP or the TRP group and a PUCCH resource (for example, TRP1 corresponds to PUCCH resources 1 and 2, and TRP2 corresponds to PUCCH resources 3 and 4), candidate PUCCH resources for TRP1 can be determined as PUCCH resources 1 and 2, and the candidate PUCCH resources for TRP2 are determined as PUCCH resources 3 and 4, and then, according to the DCI corresponding to downlink transmission and a PUCCH resource indication field in the DCI, one PUCCH resource for transmitting the HARQ-ACK is determined from the candidate PUCCH resources. It is assumed that the configuration signaling configures a PUCCH resource set D (including PUCCH resource 1, PUCCH resource 2, PUCCH resource 3 and PUCCH resource 4) and a PUCCH resource set F (including PUCCH resource 5, PUCCH resource 6, PUCCH resource 7 and PUCCH resource 8), one PUCCH resource set can be selected first according to the number of UCI bits to be fed back, for example, the PUCCH resource set D is selected for downlink transmission 1, and then, the candidate PUCCH resources for TRP1 can be determined as PUCCH resource 3 and PUCCH resource 4 according to the preset correspondence relationship between the TRP or the TRP group and the PUCCH resources in the PUCCH resource set D (for example, TRP1 corresponds to PUCCH resources 3 and 4), then, according to the DCI corresponding to downlink transmission 1 and a PUCCH resource indication field in the DCI, one PUCCH resource for transmitting the HARQ-ACK is determined from the candidate PUCCH resources.

Optionally, PUCCH resources corresponding to different TRPs or TRP groups do not overlap in time domain.

For example, different groups of PUCCH resources do not overlap in time domain, or resources corresponding to one TRP or TRP group in one group of PUCCH resources do not overlap with resources corresponding to another TRP or TRP group. In this way, efficient transmission for different TRPs or TRP groups can be achieved.

However, the PUCCH resources corresponding to different TRPs or TRP groups may also overlap in the time domain, and therefore, optionally, the method further includes: if PUCCH resources corresponding to different TRPs or TRP groups overlap in the time domain, then selecting one PUCCH for HARQ-ACK transmission based on a preset condition.

In this way, for a situation where PUCCH resources corresponding to different TRPs or TRP groups overlap in time domain, for example, PUCCH resources corresponding to different TRPs or TRP groups are in the same slot, and OFDM symbols occupied by the PUCCH resources may overlap, one PUCCH may be selected for HARQ-ACK transmission based on a preset condition.

The preset condition includes, but is not limited to: selecting a PUCCH carrying a HARQ-ACK of downlink transmission with a higher priority according to a priority of a TRP or a TRP group or a priority of the downlink transmission.

It should also be noted that, in this embodiment, prior to steps 102, 103, the method further includes: confirming that one of the following conditions is satisfied:

multiple TRPs are used for transmission;

a non-ideal backhaul exists between TRPs or TRP groups;

an indication signaling is received, wherein the indication signaling is used for indicating a TRP or a TRP group corresponding to the downlink transmission.

In this way, the steps 102 and 103 may be performed under at least one of following conditions: multiple TRPs are used for transmission; a non-ideal backhaul exists between TRPs or TRP groups; an indication signaling indicating a TRP or a TRP group corresponding to the downlink transmission is received.

The indication signaling may be a higher layer signaling. The indication signaling can directly indicate execution of steps 102 and 103 by a mark position which is specific information; or, the indication signaling is other configuration information, and it may be implicitly, according to the other configuration information, determined whether to execute step 102 and step 103. For example, if the indication signaling configures a plurality of groups of PUCCH resources, then the above operations are performed; or if the indication signaling configures a PUCCH resource set containing more than a predetermined number of PUCCH resources, then the above operations are performed; or, if the indication signaling configures the correspondence relationship between the TRP or the TRP group and the resources in the PUCCH resource set, then the above operations are performed; or, the higher layer signaling configures information such as CORESET/search space/DCI/RNTI corresponding to different beams, then the above operations are performed.

Correspondingly, after the base station sends the downlink transmission, the base station receives HARQ-ACK of transmission in PUCCH according to the TRP or the TRP group corresponding to the downlink transmission, wherein, HARQ-ACKs of downlink transmissions corresponding to different TRPs or TRP groups are transmitted on different PUCCHs; different PUCCHs are PUCCHs using different PUCCH resources, or PUCCH transmitted on non-overlapping symbols on the same carrier, or PUCCHs transmitted on different carriers.

The application of the information transmission method of the embodiment of the present disclosure is described below in connection with specific scenarios.

Scenario 1: assuming that two TRPs operate on the same carrier in a system, TRP1 corresponds to CORESET1, and TRP2 corresponds to CORESET2. According to the CORESET in which DCI is detected, the terminal actually can determines the DCI and which TRP the downlink transmission scheduled by the DCI corresponds to, so that a corresponding HARQ-ACK can be transmitted on the corresponding PUCCH resource. For example, two groups of PUCCH resource sets are pre-configured in a higher layer signaling, and each group of PUCCH resource sets includes 4 PUCCH resource sets, so a total of 8 PUCCH resource sets are configured. Assuming that 8 resources are included in each PUCCH resource set. then it may be known, according to configuration relationship, that for example, the Group A of PUCCH resource sets, that is, first to fourth PUCCH resource sets, is associated with CORESET1, that is, associated with TRP1, and the Group B of PUCCH resource sets, that is, fifth to eighth PUCCH resource sets, is associated with CORESET2, that is, associated with TRP2. Eight PUCCH resources are included in each resource set of the first to fourth PUCCH resource sets, and the eight PUCCH resources may have different PUCCH-related parameters, such as different PUCCH formats, different time-domain symbol positions and numbers, different numbers of physical resource blocks (PRBs), the same beam or different beams, and the like. Different PUCCH resource sets correspond to different amounts of UCI bits for carrying different sizes of UCI loads of corresponding TRPs. The same condition applies to the fifth to eighth PUCCH resource sets.

The terminal monitors the DCI in the PDCCH monitoring occasions corresponding to CORESET1 and CORESET2, and multiplexes the HARQ-ACKs corresponding to the PDSCHs scheduled by the DCI detected in CORESET1 into the same PUCCH for transmission. First, one of the first to fourth resource sets is selected according to the number of bits of HARQ-ACKs multiplexed for transmission, and then, according to a 3-bit PUCCH resource indication field in the last DCI corresponding to the HARQ-ACKs multiplexed for transmission in the PUCCH, one PUCCH resource is determined in the selected one PUCCH resource set, and the HARQ-ACKs corresponding to the PDSCHs scheduled by the DCIs detected in the CORESET1 are transmitted on the PUCCH resource. Similarly, HARQ-ACKs corresponding to the PDSCHs scheduled by DCI detected in the CORESET2 are multiplexed on the same PUCCH for transmission, and one of the fifth to eighth resource sets is selected according to the number of bits of HARQ-ACKs multiplexed for transmission, and then one PUCCH resource is determined in the selected one PUCCH resource set according to the 3-bit PUCCH resource indication field in the last DCI corresponding to the HARQ-ACKs multiplexed for transmission on the PUCCH. The HARQ-ACKs corresponding to the PDSCHs scheduled by the DCIs detected in the CORESET2 are transmitted on the PUCCH resource.

The base station receives the HARQ-ACKs corresponding to the DCIs sent in the corresponding CORESET on the corresponding PUCCH according to the same rule as above, that is, TRP1 serves as a receiving node, a HARQ-ACK corresponding to TRP1 is received on one PUCCH determined from one resource set selected from the first to fourth resource sets according to the above rule; and TRP2 serves as a receiving node, a HARQ-ACK corresponding to TRP2 is received on one PUCCH determined from one resource set selected from the fifth to eighth resource sets according to the above rule.

Scenario 2: assuming that two TRPs operate on the same carrier in a system, TRP1 corresponds to CORESET1, and TRP2 corresponds to CORESET2. According to the CORESET in which DCI is detected, the terminal actually can determines the DCI and which TRP the downlink transmission scheduled by the DCI corresponds to, so that a corresponding HARQ-ACK can be transmitted on the corresponding PUCCH resource. For example, one group of PUCCH resource sets is pre-configured in a higher layer signaling, and the group of PUCCH resource sets includes 4 PUCCH resource sets. Assuming that 16 resources are included in each PUCCH resource set, then it may be known, according to configuration relationship, that first to eighth PUCCH resources in each PUCCH resource sets are associated with CORESET1, that is, associated with TRP1, and ninth to sixteenth PUCCH resources are associated with CORESET2, that is, associated with TRP2. The eight PUCCH resources associated with the same TRP may have different PUCCH-related parameters, such as different PUCCH formats, different time-domain symbol positions and numbers, different numbers of physical resource blocks (PRBs), the same beam or different beams, and the like. Different amounts of UCI bits corresponding to different PUCCH resource sets are used for carrying different sizes of UCI loads of corresponding TRPs.

The terminal monitors the DCI in the PDCCH monitoring occasions corresponding to CORESET1 and CORESET2, and multiplexes the HARQ-ACKs corresponding to the PDSCHs scheduled by the DCI detected in CORESET1 into the same PUCCH for transmission. First, one of the first to fourth resource sets is selected according to the number of bits of HARQ-ACKs multiplexed for transmission, and then, according to a 3-bit PUCCH resource indication field in the last DCI corresponding to the HARQ-ACKs multiplexed for transmission in the PUCCH, one PUCCH resource is determined from PUSCH resource subsets (i.e., the first to the eighth resources in the selected one PUCCH resource set) corresponding to the TRP 1 in the selected one PUCCH resource set, and the HARQ-ACKs corresponding to the PDSCHs scheduled by the DCI detected in the CORESET1 are transmitted on the PUCCH resource. Similarly, HARQ-ACKs corresponding to the PDSCHs scheduled by DCI detected in the CORESET2 are multiplexed on the same PUCCH for transmission, and one of the first to fourth resource sets is selected according to the number of bits of HARQ-ACKs multiplexed for transmission, and then one PUCCH resource is determined from PUCCH resource subset (i.e., the ninth to sixteenth resources in the selected PUCCH resource set) corresponding to TRP2 in the selected one PUCCH resource set according to the 3-bit PUCCH resource indication field in the last DCI corresponding to the HARQ-ACKs multiplexed for transmission on the PUCCH. The HARQ-ACKs corresponding to the PDSCHs scheduled by the DCIs detected in the CORESET2 are transmitted on the PUCCH resource. The 3-bit indication field indicates one of the eighth resources included in one resource subset in the resource set, for example, the first to the eighth resources are numbered from 0 to 7, the ninth to the sixteenth resources are also numbered from 0 to 7, then the terminal determine, according to the TRP corresponding to DCI, whether number values from 0 to 7 based on the first resource or number values from 0 to 7 based on the ninth resource are used to determine the indicated resource. Of course, if the last eight resources and the first eight resources are PUCCH resources continuously numbered, i.e., numbered from 0 to 15, then the resource may also be determined based on a manner of a 3-bit indication in the DCI plus an offset value (3-bit indication+offset value), and the offset value is related to a TRP. For example, the offset value for the first TRP is 0, and the offset value of the second TRP is 8.

The base station receives the HARQ-ACKs corresponding to the DCIs sent in the corresponding CORESET on the corresponding PUCCH respectively according to the same rule as above, that is, TRP1 serves as a receiving node, a HARQ-ACK corresponding to TRP1 is received on one PUCCH determined from eight resources corresponding to the TRP1, in one resource set selected from the first to fourth resource sets according to the above rule; and TRP2 serves as a receiving node, a HARQ-ACK corresponding to TRP2 is received on one PUCCH determined from eight resources corresponding to the TRP, in one resource set selected from the first to the fourth resource sets according to the above rule.

Scenario 3: assuming that different TRPs operate on different carriers. For example, TRP1 operates on carrier 1 and carrier 2, and TRP2 operates on carrier 3 and carrier 4. Thus, the carrier 1 and the carrier 2 may be regarded as one carrier group or a PUCCH group, and the carrier 3 and the carrier 4 may be regarded as one carrier group or a PUCCH group. UCI transmission in different carrier groups or PUCCH groups are performed independently. For example, UCI is transmitted through PUCCH on the carrier 1 in the first carrier group or the first PUCCH group; UCI is transmitted through PUCCH on the carrier 3 in the second carrier group or the second PUCCH group. Since the PUCCHs are transmitted on different carriers within different carrier groups or different PUCCH groups, a resource of a PUCCH on each transmission carrier is independently configured for the carrier, and the PUCCH can be simultaneously transmitted on different carriers at the same time, of course, may also be transmitted at different time instants. Each TRP can obtain UCI corresponding to the TRP on the carrier for transmitting the PUCCH in a corresponding serving carrier group or PUCCH group. UCI transmissions for different TRPs are relatively independent, and can ensure that different TRPs can obtain the corresponding UCI in time.

It should also be known that, in the above scenario 1, if one PUCCH resource set contains more than 8 resources, then when this PUCCH resource set is selected, one of the resources may be determined jointly according to a 3-bit PUCCH resource indication field in the DCI and a control channel element (CCE) index used by the DCI, that is, the 3-bit PUCCH resource indication field may be used to determine a subset, in the PUCCH resource set, containing multiple PUCCH resources, and further determine one PUCCH resource in the subset according to the CCE index. Similarly, in the above scenario 2, if the number of resources in the resource subset corresponding to one TRP in one PUCCH resource set exceeds eight, then the resource may be further determined according to the CCE index of the DCI.

In the above embodiment, identification of a TRP is realized through different CORESETs, and may also be realized through all other methods capable of being used to identify the TRP, such as different DCI sizes/formats/RNTI/monitoring occasions/search spaces/DMRS ports/transmission configuration indicator (TCIs) information/beam information of downlink transmission, and the method of determining is the same as above, which is not described in detail.

In summary, when a non-ideal backhaul exists among a plurality of TRPs or TRP groups, it is possible to ensure that TRP1 and TRP2 perform corresponding HARQ-ACK reception according to respective scheduling conditions, thereby performing reasonable retransmission, and avoiding a large latency as a result of a case that only one TRP receives PUCCH and other TRPs need to obtain, through the backhaul, a corresponding HARQ-ACK from the TRP receiving the PUCCH; meanwhile, different PUCCHs correspond to different TRPs, a suitable beam corresponding to the TRP may be used for transmission, that is, beams for different PUCCHs are independent, which can be configured according to requirements to improve a transmission performance. Additionally, in order to avoid resource conflict caused by independent scheduling among TRPs, when a PUCCH resource set is configured, it is possible to ensure that PUCCH resources in the PUCCH resource sets corresponding to different TRPs do not overlap in one slot, thereby ensuring that conflict among corresponding PUCCH resources does not occur even if information interaction is not performed among the TRPs.

Figure 5:
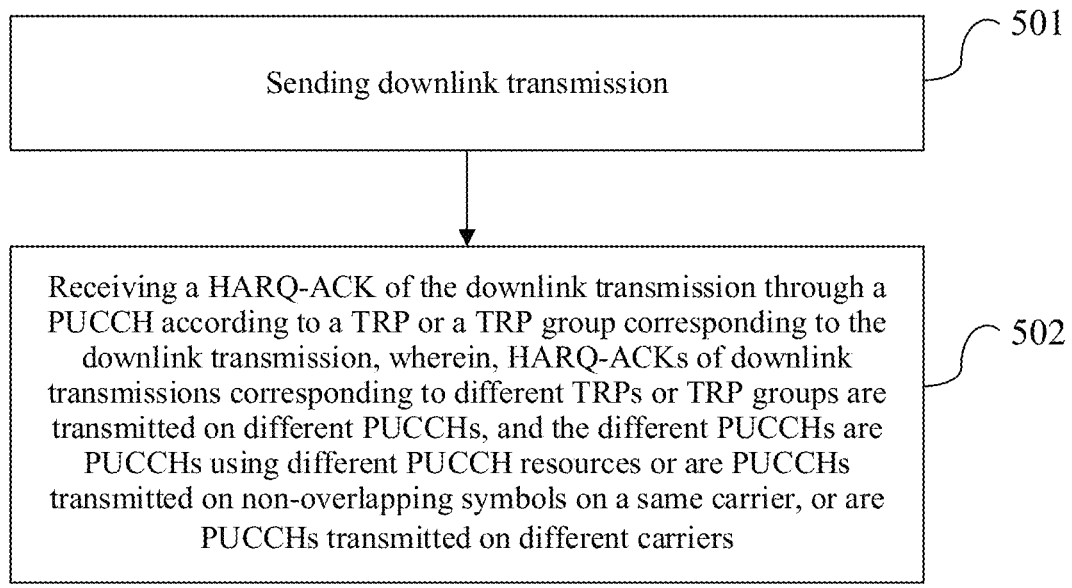
FIG. 5 is a flowchart of an information transmission method applied to a network device according to an embodiment of the present disclosure.

As shown in FIG. 5, an information transmission method according to an embodiment of the present disclosure includes steps 501-502.

Step 501: sending downlink transmission.

Step 502: receiving a HARQ-ACK of the downlink transmission through a PUCCH according to a TRP or a TRP group corresponding to the downlink transmission, wherein, HARQ-ACKs of downlink transmissions corresponding to different TRPs or TRP groups are transmitted on different PUCCHs, and the different PUCCHs are PUCCHs using different PUCCH resources or are PUCCHs transmitted on non-overlapping symbols on a same carrier, or are PUCCHs transmitted on different carriers.

According to the above steps 501 and 502, the network device applying the information transmission method according to the embodiment of the present disclosure can send downlink transmission and receive different PUCCHs carrying HARQ-ACKs of downlink transmission corresponding to different TRPs or TRP groups, wherein different PUCCHs are PUCCHs using different PUCCH resources or are PUCCHs transmitted on non-overlapping symbols on the same carrier, or are PUCCHs transmitted on different carriers. In this way, it realizes independent information transmission for different TRPs, avoids the information transmission latency, and meets service requirement.

The downlink transmission includes at least one of the following: a PDSCH, a SPS PDSCH release, and a PDCCH indicating the SPS PDSCH release.

The PUCCH is transmitted using a beam corresponding to the TRP or the TRP group corresponding to the downlink transmission.

Receiving the HARQ-ACK of the downlink transmission through the PUCCH according to the TRP or the TRP group corresponding to the downlink transmission includes: determining multiple groups of PUCCH resource sets according to a configuration signaling, wherein different groups of PUCCH resource sets correspond to different TRPs or TRP groups; determining a PUCCH resource for carrying the HARQ-ACK of the downlink transmission from a group of PUCCH resource sets corresponding to the TRP or the TRP group corresponding to the downlink transmission; receiving the HARQ-ACK of the downlink transmission on the PUCCH resource.

Each group of PUCCH resource sets in the multiple groups of PUCCH resource sets includes at least one PUCCH resource set, and different PUCCH resource sets correspond to different numbers of uplink control information (UCI) bits.

Determining the PUCCH resource for carrying the HARQ-ACK of the downlink transmission from the group of PUCCH resource sets corresponding to the TRP or the TRP group corresponding to the downlink transmission includes: if the group of PUCCH resource sets corresponding to the TRP or the TRP group corresponding to the downlink transmission includes only one PUCCH resource set, then according to the DCI corresponding to the downlink transmission, determining, in the PUCCH resource set, the PUCCH resource for carrying the HARQ-ACK of the downlink transmission; if the group of PUCCH resource sets corresponding to the TRP or the TRP group corresponding to the downlink transmission includes at least two PUCCH resource sets, then selecting one PUCCH resource set according to the number of UCI bits to be fed back, and determining, according to the DCI corresponding to the downlink transmission, the PUCCH resource for carrying the HARQ-ACK of the downlink transmission in the selected one PUCCH resource set.

Receiving the HARQ-ACK of the downlink transmission through the PUCCH according to the TRP or the TRP group corresponding to the downlink transmission includes: determining at least one PUCCH resource set according to a configuration signaling, wherein the PUCCH resource set includes PUCCH resources corresponding to different TRPs or TRP groups; determining, from PUCCH resources corresponding to the TRP or the TRP group corresponding to the downlink transmission in the PUCCH resource set, the PUCCH resource for carrying the HARQ-ACK of the downlink transmission; receiving the HARQ-ACK of the downlink transmission on the PUCCH resource.

Determining, from the PUCCH resources corresponding to the TRP or the TRP group corresponding to the downlink transmission in the PUCCH resource set, the PUCCH resource for carrying the HARQ-ACK of the downlink transmission includes: if the configuration signaling configures only one PUCCH resource set, then according to the preset correspondence relationship between a TRP or a TRP group and a PUCCH resource in the one PUCCH resource set, determining, in the PUCCH resource set, one or more PUCCH resources corresponding to a TRP or a TRP group corresponding to the downlink transmission as candidate PUCCH resources, and according to the DCI corresponding to the downlink transmission, determining, from the candidate PUCCH resources, a PUCCH resource for carrying the HARQ-ACK of the downlink transmission; if the configuration signaling configures at least two PUCCH resource sets, then selecting one PUCCH resource set according to the number of UCI bits to be fed back, and according to the preset correspondence relationship between a TRP or a TRP group and a PUCCH resource in the selected one PUCCH resource set, determining, in the selected one PUCCH resource set, one or more PUCCH resources corresponding to a TRP or a TRP group corresponding to the downlink transmission as candidate PUCCH resources, and according to the DCI corresponding to the downlink transmission; determining, from the candidate PUCCH resources, the PUCCH resource for carrying the HARQ-ACK of the downlink transmission.

PUCCH resources corresponding to different TRPs or TRP groups do not overlap in time domain.

The method further includes: if PUCCH resources corresponding to different TRPs or TRP groups overlap in time domain, then selecting, based on a preset condition, one PUCCH for HARQ-ACK reception.

Before receiving the HARQ-ACK of the downlink transmission through the PUCCH according to the TRP or the TRP group corresponding to the downlink transmission, the method further includes: confirming that one of the following conditions is satisfied:

multiple TRPs are used for transmission;
a non-ideal backhaul exists between TRPs or TRP groups;
an indication signaling is sent, wherein the indication signaling is used for indicating a TRP or a TRP group corresponding to the downlink transmission.

It should be noted that this method corresponds to the previous embodiment of the information transmission method applied to the terminal, and implementations of the above embodiment of the information transmission method applied to the terminal is applicable to this method. The same technical effect can be achieved.

Figure 6:
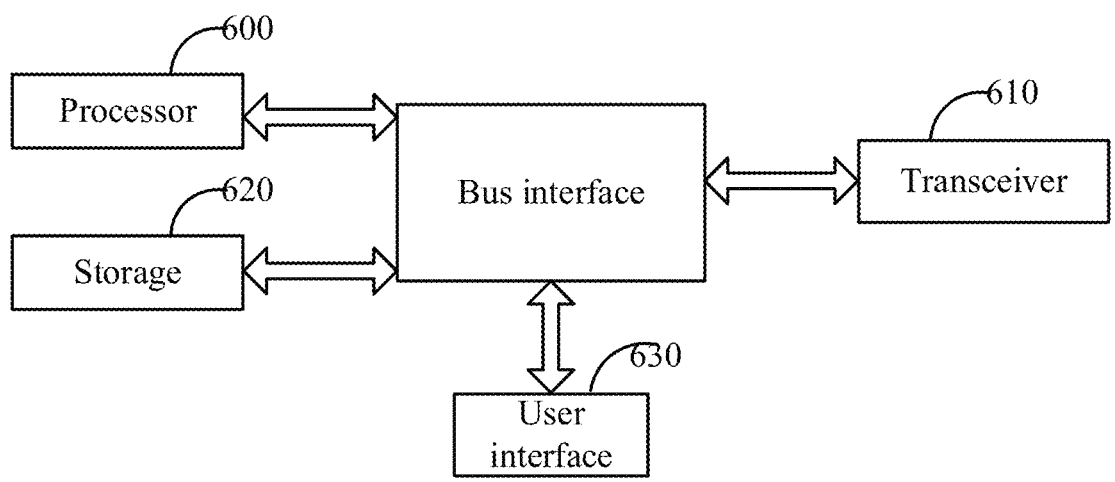
FIG. 6 is a schematic structural diagram of a terminal according to an embodiment of the present disclosure.

As shown in FIG. 6, an embodiment of the present disclosure also provides a terminal. The terminal includes a transceiver 610, a storage 620, a processor 600, and a computer program stored on the storage 620 and executable by the processor 600;

The transceiver 610 is configured to receive downlink transmission.

The processor 600 is configured to identify a transmission reception point (TRP) or a TRP group corresponding to the downlink transmission.

The transceiver 610 is further configured to transmit a Hybrid Automatic Repeat request Acknowledge (HARQ-ACK) of the downlink transmission to the TRP or the TRP group corresponding to the downlink transmission through a Physical Uplink Control Channel (PUCCH), wherein, HARQ-ACKs of downlink transmissions corresponding to different TRPs or TRP groups are transmitted on different PUCCHs, and the different PUCCHs are PUCCHs using different PUCCH resources or are PUCCHs transmitted on non-overlapping symbols on a same carrier, or are PUCCHs transmitted on different carriers.

The downlink transmission includes at least one of the following: a PDSCH, a SPS PDSCH release, and a PDCCH indicating the SPS PDSCH release.

The PUCCH is transmitted using a beam corresponding to the TRP or the TRP group corresponding to the downlink transmission.

The processor is further configured to: identify first information corresponding to the downlink transmission, wherein the first information includes at least one of following: a format of downlink control information (DCI) for scheduling the downlink transmission, a size of the DCI for scheduling the downlink transmission, a Radio Network Temporary Identifier (RNTI) corresponding to the downlink transmission, a control resource set (CORESET)/a search space/a monitoring occasion where the DCI for scheduling the downlink transmission is located, an indication field in the DCI for scheduling the downlink transmission, a beam/Demodulation Reference Signal (DMRS) port for the downlink transmission, and a beam/DMRS port for the DCI for scheduling the downlink transmission; and determine the TRP or the TRP group corresponding to the downlink transmission according to correspondence relationship between the first information and a TRP or a TRP group.

The processor is further configured to: determine multiple groups of PUCCH resource sets according to a received configuration signaling, wherein different groups of PUCCH resource sets correspond to different TRPs or TRP groups; determine a PUCCH resource for transmitting the HARQ-ACK of downlink transmission from a group of PUCCH resource sets corresponding to the TRP or the TRP group corresponding to the downlink transmission.

The transceiver is further configured to transmit the HARQ-ACK of the downlink transmission on the PUCCH resource.

Each group of PUCCH resource sets in the multiple groups of PUCCH resource sets includes at least one PUCCH resource set, and different PUCCH resource sets correspond to different numbers of uplink control information (UCI) bits.

The processor is further configured to: if a group of PUCCH resource sets corresponding to the TRP or the TRP group corresponding to the downlink transmission includes only one PUCCH resource set, then according to the DCI corresponding to the downlink transmission, determine, in the PUCCH resource set, the PUCCH resource for transmitting the HARQ-ACK of the downlink transmission; if a group of PUCCH resource sets corresponding to the TRP or the TRP group corresponding to the downlink transmission includes at least two PUCCH resource sets, then select one PUCCH resource set according to the number of UCI bits to be fed back, and determine, according to the DCI corresponding to the downlink transmission, the PUCCH resource for transmitting the HARQ-ACK of the downlink transmission in the selected one PUCCH resource set.

The processor is further configured to: determine at least one PUCCH resource set according to a received configuration signaling, wherein the PUCCH resource set includes PUCCH resources corresponding to different TRPs or TRP groups; determine, from PUCCH resources corresponding to the TRP or the TRP group corresponding to the downlink transmission in the PUCCH resource set, the PUCCH resource for transmitting the HARQ-ACK of the downlink transmission.

The transceiver is further configured to: transmit the HARQ-ACK of the downlink transmission on the PUCCH resource.

The processor is further configured to: if the configuration signaling configures only one PUCCH resource set, then according to preset correspondence relationship between a TRP or a TRP group and a PUCCH resource in the one PUCCH resource set, determine, in the PUCCH resource set, one or more PUCCH resources corresponding to a TRP or a TRP group corresponding to the downlink transmission as candidate PUCCH resources, and according to the DCI corresponding to the downlink transmission, determine, from the candidate PUCCH resources, a PUCCH resource for transmitting the HARQ-ACK of the downlink transmission; if the configuration signaling configures at least two PUCCH resource sets, then select one PUCCH resource set according to the number of UCI bits to be fed back, and according to the preset correspondence relationship between a TRP or a TRP group and a PUCCH resource in the selected one PUCCH resource set, determine, in the selected one PUCCH resource set, one or more PUCCH resources corresponding to a TRP or a TRP group corresponding to the downlink transmission as candidate PUCCH resources, and according to the DCI corresponding to the downlink transmission; determine, from the candidate PUCCH resources, a PUCCH resource for transmitting the HARQ-ACK of the downlink transmission.

PUCCH resources corresponding to different TRPs or TRP groups do not overlap in time domain.

The processor is further configured to: if PUCCH resources corresponding to different TRPs or TRP groups overlap in time domain, then select one PUCCH for HARQ-ACK transmission based on a preset condition.

The processor is further configured to: confirm that one of the following conditions is satisfied:
 multiple TRPs are used for transmission;
 a non-ideal backhaul exists between TRPs or TRP groups;
 an indication signaling is received, wherein the indication signaling is used for indicating a TRP or a TRP group corresponding to the downlink transmission.

The transceiver 610 is configured to receive and transmit data under the control of the processor 600. In FIG. 6, a bus architecture may include any number of interconnected buses and bridges, and connects various circuits including one or more processors represented by the processor 600 and a storage represented by the storage 602. The bus architecture may also connect various other circuits such as peripherals, voltage regulators and power management circuits, which are well known in the art. Therefore, a detailed description thereof is omitted herein. A bus interface provides an interface. The transceiver 610 may be multiple elements, such as a transmitter and a receiver, to allow for communication with various other apparatuses on the transmission medium. For different user equipments, a user interface 630 may be an interface capable of externally or internally connecting a required device, and the connected device includes, but is not limited to: a keypad, a display, a speaker, a microphone, a joystick and the like.

The processor 600 is responsible for supervising the bus architecture and normal processing and the storage 620 may store the data being used by the processor 600 during operation.

The terminal in this embodiment of the present disclosure can identify the TRPs or the TRP groups corresponding to the downlink transmissions by receiving the downlink transmissions from the base station, and transmit HARQ-ACKs of downlink transmissions corresponding to different TRPs or TRP groups on different PUCCHs, wherein different PUCCHs are PUCCHs using different PUCCH resources or are PUCCHs transmitted on non-overlapping symbols on the same carrier, or are PUCCHs transmitted on different carriers. In this way, it realizes independent information transmission for different TRPs, avoids the information transmission latency, and meets service requirement.

Figure 7:
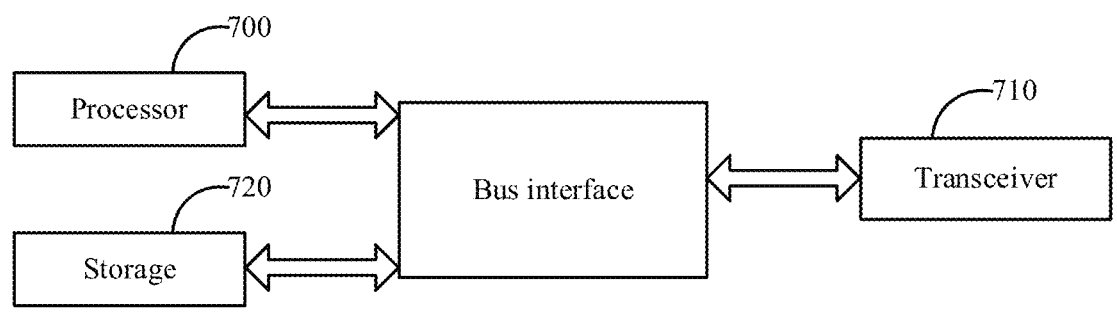
FIG. 7 is a schematic structural diagram of a network device according to an embodiment of the present disclosure.

As shown in FIG. 7, an embodiment of the present disclosure provides a network device. The network device includes a transceiver 710, a storage 720, a processor 700 and a computer program stored on the storage 720 and executable by the processor 700.

Transceiver 710 is configured to: send downlink transmission; receive a HARQ-ACK of the downlink transmission through a PUCCH according to a TRP or a TRP group corresponding to the downlink transmission, wherein, HARQ-ACKs of downlink transmissions corresponding to different TRPs or TRP groups are transmitted on different PUCCHs, and the different PUCCHs are PUCCHs using different PUCCH resources or are PUCCHs transmitted on non-overlapping symbols on a same carrier, or are PUCCHs transmitted on different carriers.

The downlink transmission includes at least one of the following: a PDSCH, a SPS PDSCH release, and a PDCCH indicating the SPS PDSCH release.

The PUCCH is transmitted using a beam corresponding to the TRP or the TRP group corresponding to the downlink transmission.

The processor is further configured to: determine multiple groups of PUCCH resource sets according to a configuration signaling, wherein different groups of PUCCH resource sets correspond to different TRPs or TRP groups; determine a PUCCH resource for carrying the HARQ-ACK of the downlink transmission from a group of PUCCH resource sets corresponding to the TRP or the TRP group corresponding to the downlink transmission.

The transceiver is further configured to receive the HARQ-ACK of the downlink transmission on the PUCCH resource.

Each group of PUCCH resource sets in the multiple groups of PUCCH resource sets includes at least one PUCCH resource set, and different PUCCH resource sets correspond to different numbers of uplink control information (UCI) bits.

The processor is further configured to: if the group of PUCCH resource sets corresponding to the TRP or the TRP group corresponding to the downlink transmission includes only one PUCCH resource set, then according to the DCI corresponding to the downlink transmission, determine, in the PUCCH resource set, the PUCCH resource for carrying the HARQ-ACK of the downlink transmission; if the group of PUCCH resource sets corresponding to the TRP or the TRP group corresponding to the downlink transmission includes at least two PUCCH resource sets, then select one PUCCH resource set according to the number of UCI bits to be fed back, and determine, according to the DCI corresponding to the downlink transmission, the PUCCH resource for carrying the HARQ-ACK of the downlink transmission in the selected one PUCCH resource set.

The processor is further configured to: determine at least one PUCCH resource set according to a configuration signaling, wherein the PUCCH resource set includes PUCCH resources corresponding to different TRPs or TRP groups; determine, from PUCCH resources corresponding to the TRP or the TRP group corresponding to the downlink transmission in the PUCCH resource set, the PUCCH resource for carrying the HARQ-ACK of the downlink transmission. The transceiver is further configured to receive the HARQ-ACK of the downlink transmission on the PUCCH resource.

The processor is further configured to: if the configuration signaling configures only one PUCCH resource set, then according to the preset correspondence relationship between a TRP or a TRP group and a PUCCH resource in the one PUCCH resource set, determine, in the PUCCH resource set, one or more PUCCH resources corresponding to a TRP or a TRP group corresponding to the downlink transmission as candidate PUCCH resources, and according to the DCI corresponding to the downlink transmission, determine, from the candidate PUCCH resources, a PUCCH resource for transmitting the HARQ-ACK of the downlink transmission; if the configuration signaling configures at least two PUCCH resource sets, then select one PUCCH resource set according to the number of UCI bits to be fed back, and according to the preset correspondence relationship between a TRP or a TRP group and a PUCCH resource in the selected one PUCCH resource set, determine, in the selected one PUCCH resource set, one or more PUCCH resources corresponding to a TRP or a TRP group corresponding to the downlink transmission as candidate PUCCH resources, and according to the DCI corresponding to the downlink transmission; determine, from the candidate PUCCH resources, the PUCCH resource for carrying the HARQ-ACK of the downlink transmission.

PUCCH resources corresponding to different TRPs or TRP groups do not overlap in time domain.

The processor is further configured to: if PUCCH resources corresponding to different TRPs or TRP groups overlap in time domain, then select, based on a preset condition, one PUCCH for HARQ-ACK reception.

The processor is further configured to: confirm that one of the following conditions is satisfied:
 multiple TRPs are used for transmission;
 a non-ideal backhaul exists between TRPs or TRP groups;
 an indication signaling is sent, wherein the indication signaling is used for indicating a TRP or a TRP group corresponding to the downlink transmission.

The transceiver 710 is configured to receive and transmit data under the control of the processor 700. In FIG. 7, a bus architecture may include any number of interconnected buses and bridges, and connects various circuits including one or more processors represented by the processor 700 and a storage represented by the storage 720. The bus architecture may also connect various other circuits such as peripherals, voltage regulators and power management circuits, which are well known in the art. Therefore, a detailed description thereof is omitted herein. A bus interface provides an interface. The transceiver 710 may be multiple elements, such as a transmitter and a receiver, to allow for communication with various other apparatuses on the transmission medium. The processor 700 is responsible for supervising the bus architecture and normal processing and the storage 720 may store the data being used by the processor 700 during operation.

The processor 700 is responsible for supervising the bus architecture and normal processing and the storage 720 may store the data being used by the processor 700 during operation.

The network device can send downlink transmission, and receive different PUCCHs which carry HARQ-ACKs of downlink transmissions corresponding to different TRPs or TRP groups, wherein different PUCCHs are PUCCHs using different PUCCH resources or are PUCCHs transmitted on non-overlapping symbols on the same carrier, or are PUCCHs transmitted on different carriers. In this way, it realizes independent information transmission for different TRPs, avoids the information transmission latency, and meets service requirement.

An embodiment of the present disclosure also provides an information transmission apparatus. The information transmission apparatus includes a first receiving module, a processing module, and a first sending module.

The first receiving module is configured to receive downlink transmission. The processing module is configured to identify a transmission reception point (TRP) or a TRP group corresponding to the downlink transmission. The first sending module is configured to transmit a Hybrid Automatic Repeat request Acknowledge (HARQ-ACK) of the downlink transmission to the TRP or the TRP group corresponding to the downlink transmission through a Physical Uplink Control Channel (PUCCH), wherein, HARQ-ACKs of downlink transmissions corresponding to different TRPs or TRP groups are transmitted on different PUCCHs, and the different PUCCHs are PUCCHs using different PUCCH resources or are PUCCHs transmitted on non-overlapping symbols on a same carrier, or are PUCCHs transmitted on different carriers.

The downlink transmission includes at least one of the following: a Physical downlink shared channel (PDSCH), a Semi-Persistent Scheduling (SPS) PDSCH release, and a PDCCH indicating the SPS PDSCH release.

The PUCCH is transmitted using a beam corresponding to the TRP or the TRP group corresponding to the downlink transmission.

The processing module includes a first processing sub-module and a second processing sub-module.

The first processing sub-module is configured to identify first information corresponding to the downlink transmission, wherein the first information includes at least one of following: a format of downlink control information (DCI) for scheduling the downlink transmission, a size of the DCI for scheduling the downlink transmission, a Radio Network Temporary Identifier (RNTI) corresponding to the downlink transmission, a control resource set (CORESET)/a search space/a monitoring occasion where the DCI for scheduling the downlink transmission is located, an indication field in the DCI for scheduling the downlink transmission, a beam/Demodulation Reference Signal (DMRS) port for the downlink transmission, and a beam/DMRS port for the DCI for scheduling the downlink transmission. The second processing sub-module is configured to determine the TRP or the TRP group corresponding to the downlink transmission according to correspondence relationship between the first information and a TRP or a TRP group.

The first sending module includes a first determining sub-module, a second determining sub-module, and a first sending sub-module.

The first determining sub-module is configured to determine multiple groups of PUCCH resource sets according to a received configuration signaling, wherein different groups of PUCCH resource sets correspond to different TRPs or TRP groups. The second determining sub-module is configured to determine a PUCCH resource for transmitting the HARQ-ACK of downlink transmission from a group of PUCCH resource sets corresponding to the TRP or the TRP group corresponding to the downlink transmission. The first sending sub-module is configured to transmit the HARQ-ACK of the downlink transmission on the PUCCH resource.

Each group of PUCCH resource sets in the multiple groups of PUCCH resource sets includes at least one PUCCH resource set, and different PUCCH resource sets correspond to different numbers of uplink control information (UCI) bits.

The second determining sub-module is further configured to: if a group of PUCCH resource sets corresponding to the TRP or the TRP group corresponding to the downlink transmission includes only one PUCCH resource set, then according to the DCI corresponding to the downlink transmission, determine, in the PUCCH resource set, the PUCCH resource for transmitting the HARQ-ACK of the downlink transmission; if a group of PUCCH resource sets corresponding to the TRP or the TRP group corresponding to the downlink transmission includes at least two PUCCH resource sets, then select one PUCCH resource set according to the number of UCI bits to be fed back, and determine, according to the DCI corresponding to the downlink transmission, the PUCCH resource for transmitting the HARQ-ACK of the downlink transmission in the selected one PUCCH resource set.

The first sending module includes a third determining sub-module, a fourth determining sub-module, and a second sending sub-module.

The third determining sub-module is configured to determine at least one PUCCH resource set according to a received configuration signaling, wherein the PUCCH resource set includes PUCCH resources corresponding to different TRPs or TRP group. The fourth determining sub-module is configured to determine, from PUCCH resources corresponding to the TRP or the TRP group corresponding to the downlink transmission in the PUCCH resource set, the PUCCH resource for transmitting the HARQ-ACK of the downlink transmission. The second sending sub-module is configured to transmit the HARQ-ACK of the downlink transmission on the PUCCH resource.

The fourth determining sub-module is further configured to: if the configuration signaling configures only one PUCCH resource set, then according to the preset correspondence relationship between a TRP or a TRP group and a PUCCH resource in the one PUCCH resource set, determine, in the PUCCH resource set, one or more PUCCH resources corresponding to a TRP or a TRP group corresponding to the downlink transmission as candidate PUCCH resources, and according to the DCI corresponding to the downlink transmission, determine, from the candidate PUCCH resources, a PUCCH resource for transmitting the HARQ-ACK of the downlink transmission; if the configuration signaling configures at least two PUCCH resource sets, then select one PUCCH resource set according to the number of UCI bits to be fed back, and according to the preset correspondence relationship between a TRP or a TRP group and a PUCCH resource in the selected one PUCCH resource set, determine, in the selected one PUCCH resource set, one or more PUCCH resources corresponding to a TRP or a TRP group corresponding to the downlink transmission as candidate PUCCH resources, and according to the DCI corresponding to the downlink transmission; determine, from the candidate PUCCH resources, a PUCCH resource for transmitting the HARQ-ACK of the downlink transmission.

PUCCH resources corresponding to different TRPs or TRP groups do not overlap in time domain.

The apparatus further includes a first selecting module, configured to select one PUCCH for HARQ-ACK transmission based on a preset condition if PUCCH resources corresponding to different TRPs or TRP groups overlap in time domain.

The apparatus further includes a first confirming module, configured to confirm that one of the following conditions is satisfied:

multiple TRPs are used for transmission;

a non-ideal backhaul exists between TRPs or TRP groups;

an indication signaling is received, wherein the indication signaling is used for indicating a TRP or a TRP group corresponding to the downlink transmission.

It should be noted that this apparatus is applied with the above-described information transmission method applied to the terminal, and implementations in the embodiment of the above-described information transmission method applied to the terminal is applied to this apparatus, and the same technical effect can be achieved.

An embodiment of the present disclosure also provides an information transmission apparatus. The information transmission apparatus includes a second sending module, a second receiving module.

The second sending module is configured to send downlink transmission. The second receiving module is configured to receive a HARQ-ACK of the downlink transmission through a PUCCH according to a TRP or a TRP group corresponding to the downlink transmission, wherein, HARQ-ACKs of downlink transmissions corresponding to different TRPs or TRP groups are transmitted on different PUCCHs, and the different PUCCHs are PUCCHs using different PUCCH resources or are PUCCHs transmitted on non-overlapping symbols on a same carrier, or are PUCCHs transmitted on different carriers.

The downlink transmission includes at least one of the following: a PDSCH, a SPS PDSCH release, and a PDCCH indicating the SPS PDSCH release.

The PUCCH is transmitted using a beam corresponding to the TRP or the TRP group corresponding to the downlink transmission.

The second receiving module includes a fifth determining sub-module, a sixth determining submodule, and a first receiving sub-module.

The fifth determining sub-module is configured to determine multiple groups of PUCCH resource sets according to a configuration signaling, wherein different groups of PUCCH resource sets correspond to different TRPs or TRP groups. The sixth determining sub-module is configured to determine a PUCCH resource for carrying the HARQ-ACK of the downlink transmission from a group of PUCCH resource sets corresponding to the TRP or the TRP group corresponding to the downlink transmission. The first receiving sub-module is configured to receive the HARQ-ACK of the downlink transmission on the PUCCH resource.

Each group of PUCCH resource sets in the multiple groups of PUCCH resource sets includes at least one PUCCH resource set, and different PUCCH resource sets correspond to different numbers of uplink control information (UCI) bits.

The sixth determining sub-module is further configured to: if the group of PUCCH resource sets corresponding to the TRP or the TRP group corresponding to the downlink transmission includes only one PUCCH resource set, then according to the DCI corresponding to the downlink transmission, determine, in the PUCCH resource set, the PUCCH resource for carrying the HARQ-ACK of the downlink transmission; if the group of PUCCH resource sets corresponding to the TRP or the TRP group corresponding to the downlink transmission includes at least two PUCCH resource sets, then select one PUCCH resource set according to the number of UCI bits to be fed back, and determine, according to the DCI corresponding to the downlink transmission, the PUCCH resource for carrying the HARQ-ACK of the downlink transmission in the selected one PUCCH resource set.

The second receiving module includes a seventh determining sub-module, an eighth determining sub-module, and a second receiving sub-module.

The seventh determining sub-module is configured to determine at least one PUCCH resource set according to a configuration signaling, wherein the PUCCH resource set includes PUCCH resources corresponding to different TRPs or TRP groups. The eighth determining sub-module is configured to determine, from PUCCH resources corresponding to the TRP or the TRP group corresponding to the downlink transmission in the PUCCH resource set, the PUCCH resource for carrying the HARQ-ACK of the downlink transmission. The second receiving sub-module is configured to receive the HARQ-ACK of the downlink transmission on the PUCCH resource.

The eighth determining sub-module is further configured to: if the configuration signaling configures only one PUCCH resource set, then according to the preset correspondence relationship between a TRP or a TRP group and a PUCCH resource in the one PUCCH resource set, determine, in the PUCCH resource set, one or more PUCCH resources corresponding to a TRP or a TRP group corresponding to the downlink transmission as candidate PUCCH resources, and according to the DCI corresponding to the downlink transmission, determine, from the candidate PUCCH resources, a PUCCH resource for carrying the HARQ-ACK of the downlink transmission; if the configuration signaling configures at least two PUCCH resource sets, then select one PUCCH resource set according to the number of UCI bits to be fed back, and according to the preset correspondence relationship between a TRP or a TRP group and a PUCCH resource in the selected one PUCCH resource set, determine, in the selected one PUCCH resource set, one or more PUCCH resources corresponding to a TRP or a TRP group corresponding to the downlink transmission as candidate PUCCH resources, and according to the DCI corresponding to the downlink transmission; determine, from the candidate PUCCH resources, the PUCCH resource for carrying the HARQ-ACK of the downlink transmission.

PUCCH resources corresponding to different TRPs or TRP groups do not overlap in time domain.

The apparatus further includes a second selecting module, configured to select, based on a preset condition, one PUCCH for HARQ-ACK reception if PUCCH resources corresponding to different TRPs or TRP groups overlap in time domain.

The apparatus further includes a second confirming module, configured to confirm that one of the following conditions is satisfied:
  multiple TRPs are used for transmission;
  a non-ideal backhaul exists between TRPs or TRP groups;
  an indication signaling is sent, wherein the indication signaling is used for indicating a TRP or a TRP group corresponding to the downlink transmission.

It should be noted that, the apparatus is applied with the above information transmission method applied to the network device, and implementations of the above embodiment of the information transmission method applied to the network device is applicable to the apparatus. The same technical effect can be achieved.

Another embodiment of the present disclosure also provides a computer-readable storage medium having stored thereon a computer program. When the computer program is executed by a processor, the processor implements steps in the information transmission method applied to a terminal as above.

Another embodiment of the present disclosure also provides a computer-readable storage medium having stored thereon a computer program. When the computer program is executed by a processor, the processor implements steps in the information transmission method applied to a network device as above.

Computer-readable media include both non-transitory medium and transitory medium, and removable medium and non-removable medium, all of which may be implemented by any method or technology for information storage. The information may be computer readable instructions, data structures, modules of programs, or other data. Examples of storage media for computers include, but are not limited to, phase change random access memory (PRAM), static random access memory (SRAM), dynamic random access memory (DRAM), other types of random access memory (RAM), read only memory (ROM), electrically erasable programmable read only memory (EEPROM), flash memory or other memory technology, compact disc read only memory (CD-ROM), digital versatile disc (DVD) or other optical storage, magnetic tape cartridge, magnetic tape magnetic disk storage or other magnetic storage device or any other non-transmission medium, which may be used to store information that may be accessed by a computing device. As defined herein, a computer-readable medium does not include transitory computer-readable media, such as modulated data signals and carrier waves.

It should be further noted that the terminal described in this specification includes, but is not limited to, a smartphone, a tablet, etc., and that many of the described functional components are referred to as modules, in order to emphasize more particularly independence of implementation of the modules.

In the embodiments of the present disclosure, the modules may be implemented in software to be executed by various types of processors. For example, an identified module for executable codes may include one or more physical or logical blocks including computer instructions, which may be constructed as for example an object, a process, or a function. However, the executable codes of the identified modules need not be physically located together, but may include different instructions stored at different locations. When the instructions are logically combined together, the instructions constitute a module and achieve a specified purpose of the module.

Indeed, the module of executable codes may be a single instruction or a number of instructions, and may even be distributed over a number of different code segments, distributed among different programs, and distributed across a number of memory devices. Likewise, operational data may be identified within the module, and may be implemented in any suitable form and organized within any suitable type of data structure. The operational data may be collected as a single data set, or may be distributed across different locations (including on different storage devices), and at least in part may exist only as electronic signals on a system or network.

In a case that a module can be implement by software, the module can be implemented by software in consideration of a level of hardware process of the related art. Those skilled in the art can construct corresponding hardware circuits to implement a corresponding function, without considering costs. The hardware circuits include conventional very large scale integration (VLSI) circuits or gate arrays, and related semiconductors such as logic chips, transistors, or other discrete components. The modules may also be implemented with programmable hardware devices such as field programmable gate arrays, programmable array logic, programmable logic devices, and the like.

The exemplary embodiments described above have been described with reference to the drawings, and many different forms and embodiments are possible without departing from the spirit and teachings of the present disclosure and, therefore, the present disclosure should not be constructed as being limited to the exemplary embodiments presented herein. In particular, the exemplary embodiments are provided so that the present disclosure will be complete and thorough, and will convey the scope of the present disclosure to those skilled in the art. In the drawings, dimensions and relative dimensions of components may be exaggerated for clarity. The terms used herein are for the purpose of describing specific exemplary embodiments only and are not intended to be limiting. As used herein, singular forms such as "a", "an", and "the" are intended to incorporate plural forms as well, unless the context explicitly requires otherwise. It will be further appreciated that terms such as "comprising" and/or "including", when used in this specification, denote presence of such features, integers, steps, operations, components and/or assemblies, but do not exclude the presence or addition of one or more other features, integers, steps, operations, components, assemblies and/or groups thereof. Unless otherwise indicated, a range of values is stated to include upper and lower limits of the range and any subranges in between.

Those of ordinary skill in the art will appreciate that the example elements and algorithm steps described in connection with the embodiments disclosed herein can be implemented in electronic hardware, or a combination of computer software and electronic hardware. Whether these functions are executed in the manner of hardware or software depends on specific application and design constraint conditions of the technical solutions. One skilled in the art may implement the described functionality using different methods for each particular application, but such implementations should not be considered to go beyond the scope of the present disclosure.

It will be apparent to those skilled in the art that for convenience and conciseness of description, reference may be made to corresponding procedures in the foregoing method embodiments for specific operations of the above described systems, devices and units, which are not repeated here.

In the embodiments provided herein, it should be understood that the disclosed apparatus and methods may be implemented in other ways. For example, the above-described device embodiments are only illustrative, for example, a division to a unit is only a logical functional division, and there may be another division manner in actual implementation. For example, multiple units or components may be combined or may be integrated into another system, or some features may be omitted or not performed. Additionally, coupling or direct connection or communication connection between elements shown or discussed herein may be implemented via some interfaces, and indirect coupling or communication connections between units or elements may be electrical, mechanical or other coupling or connections.

Units described as separated elements may be or may not be physically distributed. Units shown as elements may be or may not be physical units, i.e., may be collocated in one place or distributed over multiple network units. Some or all of the units may be selected depending on actual application scenarios to implement the purpose of the technical solutions of the embodiments.

Additionally, functional units in the embodiments of the present application may be integrated in one processing units, or may be provided independently, or two or more units may be integrated as one unit.

The functions may be stored in one computer readable storage medium if being implemented by software function units and sold or used as independent products. Based on such understanding, the essential part, or the part contributing the related art, or a part of the technical solutions of the present disclosure may be embodied in software products, which are stored in a storage medium. The computer storage medium includes several instructions used to cause a computer device (which may be a personal computer, a server, or a network device, or the like) to execute all or a part of the steps in the method embodiments of the present disclosure. The storage medium include various medium capable of storing program codes, such as a flash memory, a removable disk, a ROM, a RAM, a magnetic disc, or a compact disk.

Those skilled in the art may understand that an entirety or a part of flows in the method embodiments of the present disclosure may be achieved by a computer program which controls related hardware. The program may be stored in a computer readable storage medium. When the program is executed, the flows in the method embodiments of the present disclosure are implemented. The storage medium may be a magnetic disc, a compact disk, a Read-Only Memory (ROM) or a Random Access Memory (RAM).

It may be understood that these embodiments described in embodiments of the present disclosure may be implemented by hardware, software, firmware, middleware, microcode or a combination thereof. For hardware implementation, a processing unit may be implemented in one or more Application Specific Integrated Circuits (ASIC), a Digital Signal Processor (DSP), a DSP device (DSPD), a Programmable Logic Device (PLD), a Field-Programmable Gate Array (FPGA), a general-purpose processor, a controller, a microcontroller, a microprocessor, other electronic unit configured to perform the functions in the present disclosure or a combination thereof.

For a software implementation, the techniques described in embodiments of the present disclosure may be implemented by modules (for example, processes or functions) performing the functions described in embodiments of the present disclosure. Software codes may be stored in a storage and executed by a processor. The storage may be implemented internal or external to a processor.

The above descriptions merely describe optional implementations of the present disclosure. It is appreciated, modifications and improvements may be made by a person of ordinary skill in the art without departing from the principle of the present disclosure, and these modifications and improvements shall fall within the protection scope of the present disclosure.

What is claimed is:

1. An information transmission method, comprising:
receiving downlink transmission;
identifying a transmission reception point (TRP) or a TRP group corresponding to the downlink transmission;
transmitting a Hybrid Automatic Repeat request Acknowledge (HARQ-ACK) of the downlink transmission to the TRP or the TRP group corresponding to the downlink transmission through a Physical Uplink Control Channel (PUCCH),
wherein, HARQ-ACKs of downlink transmissions corresponding to different TRPs or TRP groups are transmitted on different PUCCHs, and the different PUCCHs are PUCCHs using different PUCCH resources or are PUCCHs transmitted on non-overlapping symbols on a same carrier, or are PUCCHs transmitted on different carriers,
wherein,
transmitting the HARQ-ACK of the downlink transmission to the TRP or the TRP group corresponding to the downlink transmission through the PUCCH comprises:
determining multiple groups of PUCCH resource sets according to a received configuration signaling, wherein different groups of PUCCH resource sets correspond to different TRPs or TRP groups;
determining, from a group of PUCCH resource sets corresponding to the TRP or the TRP group corresponding to the downlink transmission, the PUCCH resource for transmitting the HARQ-ACK of downlink transmission;
transmitting the HARQ-ACK of the downlink transmission on the PUCCH resource,
wherein each group of PUCCH resource sets in the multiple groups of PUCCH resource sets comprises at least one PUCCH resource set, and if each group of PUCCH resource sets in the multiple groups of PUCCH resource sets comprises two or more PUCCH resource sets, then different PUCCH resource sets correspond to different numbers of Uplink Control Information (UCI) bits;

or, transmitting the HARQ-ACK of the downlink transmission to the TRP or the TRP group corresponding to the downlink transmission through the PUCCH comprises:
determining at least one PUCCH resource set according to a received configuration signaling, wherein the PUCCH resource set comprises PUCCH resources corresponding to different TRPs or TRP groups;
determining, from PUCCH resources corresponding to the TRP or the TRP group corresponding to the downlink transmission in the PUCCH resource set, the PUCCH resource for transmitting the HARQ-ACK of the downlink transmission;
transmitting the HARQ-ACK of the downlink transmission on the PUCCH resource.

2. The method according to claim 1, wherein the PUCCH is transmitted using a beam corresponding to the TRP or the TRP group corresponding to the downlink transmission.

3. The method according to claim 1, wherein identifying the TRP or the TRP group corresponding to the downlink transmission comprises:
identifying first information corresponding to the downlink transmission, wherein the first information comprises at least one of following: a format of Downlink Control Information (DCI) for scheduling the downlink transmission, a size of the DCI for scheduling the downlink transmission, a Radio Network Temporary Identifier (RNTI) corresponding to the downlink transmission, a Control Resource Set (CORESET)/a search space/a monitoring occasion where the DCI for scheduling the downlink transmission is located, an indication field in the DCI for scheduling the downlink transmission, a beam/Demodulation Reference Signal (DMRS) port for the downlink transmission, and a beam/DMRS port for the DCI for scheduling the downlink transmission; and
determining the TRP or the TRP group corresponding to the downlink transmission according to correspondence relationship between the first information and a TRP or a TRP group.

4. The method according to claim 1, wherein,
determining, from the group of PUCCH resource sets corresponding to the TRP or the TRP group corresponding to the downlink transmission, the PUCCH resource for transmitting the HARQ-ACK of downlink transmission comprises:
if the group of PUCCH resource sets corresponding to the TRP or the TRP group corresponding to the downlink transmission comprises only one PUCCH resource set, then according to the DCI corresponding to the downlink transmission, determining, in the PUCCH resource set, the PUCCH resource for transmitting the HARQ-ACK of the downlink transmission;
if the group of PUCCH resource sets corresponding to the TRP or the TRP group corresponding to the downlink transmission comprises at least two PUCCH resource sets, then selecting one PUCCH resource set according to the number of UCI bits to be fed back, and determining, in the selected one PUCCH resource set according to the DCI corresponding to the downlink transmission, the PUCCH resource for transmitting the HARQ-ACK of the downlink transmission;

or, determining, from the PUCCH resources corresponding to the TRP or the TRP group corresponding to the downlink transmission in the PUCCH resource set, the PUCCH resource for transmitting the HARQ-ACK of the downlink transmission comprises:
if the configuration signaling configures only one PUCCH resource set, then according to preset correspondence relationship between a TRP or a TRP group and a PUCCH resource in the one PUCCH resource set, determining, in the PUCCH resource set, one or more PUCCH resources corresponding to the TRP or the TRP group corresponding to the downlink transmission as candidate PUCCH resources, and according to the DCI corresponding to the downlink transmission, determining, from the candidate PUCCH resources, the PUCCH resource for transmitting the HARQ-ACK of the downlink transmission;
if the configuration signaling configures at least two PUCCH resource sets, then selecting one PUCCH resource set according to the number of UCI bits to be fed back, and according to preset correspondence relationship between a TRP or a TRP group and a PUCCH resource in the selected one PUCCH resource set, determining, in the selected one PUCCH resource set, one or more PUCCH resources corresponding to the TRP or the TRP group corresponding to the downlink transmission as candidate PUCCH resources, and according to the DCI corresponding to the downlink transmission; determining, from the candidate PUCCH resources, the PUCCH resource for transmitting the HARQ-ACK of the downlink transmission.

5. The method according to claim 1, wherein,
PUCCH resources corresponding to different TRPs or TRP groups do not overlap in time domain;

or,

PUCCH resources corresponding to different TRPs or TRP groups do not overlap in time domain, and the method further comprises selecting one PUCCH for HARQ-ACK transmission based on a preset condition.

6. An information transmission method, comprising:
sending downlink transmission;
receiving a Hybrid Automatic Repeat request Acknowledge (HARQ-ACK) of the downlink transmission through a Physical Uplink Control Channel (PUCCH) based on a transmission reception point (TRP) or a TRP group corresponding to the downlink transmission,
wherein, HARQ-ACKs of downlink transmissions corresponding to different TRPs or TRP groups are transmitted on different PUCCHs, and the different PUCCHs are PUCCHs using different PUCCH resources or are PUCCHs transmitted on non-overlapping symbols on a same carrier, or are PUCCHs transmitted on different carriers, wherein, receiving the HARQ-ACK of the downlink transmission through the PUCCH based on the TRP or the TRP group corresponding to the downlink transmission comprises:
  determining multiple groups of PUCCH resource sets according to a configuration signaling, wherein different groups of PUCCH resource sets correspond to different TRPs or TRP groups;
  determining, from a group of PUCCH resource sets corresponding to the TRP or the TRP group corresponding to the downlink transmission, the PUCCH resource for carrying the HARQ-ACK of downlink transmission;
  receiving the HARQ-ACK of the downlink transmission on the PUCCH resource, wherein each group of PUCCH resource sets in the multiple groups of PUCCH resource sets comprises at least one PUCCH resource set, and if each group of PUCCH resource sets in the multiple groups of PUCCH resource sets comprises two or more PUCCH resource sets, then different PUCCH resource sets correspond to different numbers of Uplink Control Information (UCI) bits;
or,
  determining at least one PUCCH resource set according to a configuration signaling, wherein the PUCCH resource set comprises PUCCH resources corresponding to different TRPs or TRP groups;
  determining, from PUCCH resources corresponding to the TRP or the TRP group corresponding to the downlink transmission in the PUCCH resource set, the PUCCH resource for carrying the HARQ-ACK of the downlink transmission;
  receiving the HARQ-ACK of the downlink transmission on the PUCCH resource.

7. The method according to claim 6, wherein, receiving the HARQ-ACK of the downlink transmission through the PUCCH based on the TRP or the TRP group corresponding to the downlink transmission further comprises:
  receiving the HARQ-ACK of the downlink transmission through the PUCCH based on the TRP or the TRP group corresponding to the downlink transmission, the PUCCH being transmitted using a beam corresponding to the TRP or the TRP group corresponding to the downlink transmission.

8. The method according to claim 6, wherein,
determining, from the group of PUCCH resource sets corresponding to the TRP or the TRP group corresponding to the downlink transmission, the PUCCH resource for carrying the HARQ-ACK of downlink transmission comprises:
  if the group of PUCCH resource sets corresponding to the TRP or the TRP group corresponding to the downlink transmission comprises only one PUCCH resource set, then according to DCI corresponding to the downlink transmission, determining, in the PUCCH resource set, the PUCCH resource for carrying the HARQ-ACK of the downlink transmission;
  if the group of PUCCH resource sets corresponding to the TRP or the TRP group corresponding to the downlink transmission comprises at least two PUCCH resource sets, then selecting one PUCCH resource set according to the number of UCI bits to be fed back, and determining, in the selected one PUCCH resource set according to DCI corresponding to the downlink transmission, the PUCCH resource for carrying the HARQ-ACK of the downlink transmission;
or,
determining, from the PUCCH resources corresponding to the TRP or the TRP group corresponding to the downlink transmission in the PUCCH resource set, the PUCCH resource for carrying the HARQ-ACK of the downlink transmission comprises:
  if the configuration signaling configures only one PUCCH resource set, then according to preset correspondence relationship between a TRP or a TRP group and a PUCCH resource in the one PUCCH resource set, determining, in the PUCCH resource set, one or more PUCCH resources corresponding to the TRP or the TRP group corresponding to the downlink transmission as candidate PUCCH resources, and according to DCI corresponding to the downlink transmission, determining, from the candidate PUCCH resources, the PUCCH resource for carrying the HARQ-ACK of the downlink transmission;
  if the configuration signaling configures at least two PUCCH resource sets, then selecting one PUCCH resource set according to the number of UCI bits to be fed back, and according to preset correspondence relationship between a TRP or a TRP group and a PUCCH resource in the selected one PUCCH resource set, determining, in the selected one PUCCH resource set, one or more PUCCH resources corresponding to the TRP or the TRP group corresponding to the downlink transmission as candidate PUCCH resources, and according to the DCI corresponding to the downlink transmission; determining, from the candidate PUCCH resources, the PUCCH resource for carrying the HARQ-ACK of the downlink transmission.

9. The method according to claim 6, wherein,
PUCCH resources corresponding to different TRPs or TRP groups do not overlap in time domain;
or,
PUCCH resources corresponding to different TRPs or TRP groups overlap in time domain, and the method further comprises selecting one PUCCH for HARQ-ACK reception based on a preset condition.

10. A terminal, comprising a transceiver, a storage, a processor and a computer program stored on the storage and executable by the processor,
  wherein the transceiver is configured to receive downlink transmission,
  the processor is configured to execute the computer program to identify a transmission reception point (TRP) or a TRP group corresponding to the downlink transmission;
  the transceiver is further configured to transmit a Hybrid Automatic Repeat request Acknowledge (HARQ-ACK) of the downlink transmission to the TRP or the TRP group corresponding to the downlink transmission through a Physical Uplink Control Channel (PUCCH), wherein,
  HARQ-ACKs corresponding to downlink transmissions of different TRPs or TRP groups are transmitted on different PUCCHs;
  different PUCCHs are PUCCHs using different PUCCH resources or PUCCHs transmitted on non-overlapping symbols on the same carrier, or PUCCHs transmitted on different carriers, wherein,
the processor is configured to execute the computer program to:
determine multiple groups of PUCCH resource sets according to a received configuration signaling, wherein different groups of PUCCH resource sets correspond to different TRPs or TRP groups;
determine, from a group of PUCCH resource sets corresponding to the TRP or the TRP group corresponding to the downlink transmission, the PUCCH resource for transmitting the HARQ-ACK of downlink transmission;
wherein the transceiver is specifically configured to transmit the HARQ-ACK of the downlink transmission on the PUCCH resource, wherein each group of PUCCH resource sets in the multiple groups of PUCCH resource sets comprises at least one PUCCH resource set, and if each group of PUCCH resource sets in the multiple groups of PUCCH resource sets comprises two or more PUCCH resource sets, then different PUCCH resource sets correspond to different numbers of Uplink Control Information (UCI) bits;
or,
the processor is configured to execute the computer program to:
determine at least one PUCCH resource set according to a received configuration signaling, wherein the PUCCH resource set comprises PUCCH resources corresponding to different TRPs or TRP groups;
determine, from PUCCH resources corresponding to the TRP or the TRP group corresponding to the downlink transmission in the PUCCH resource set, the PUCCH resource for transmitting the HARQ-ACK of the downlink transmission;
wherein the transceiver is specifically configured to transmit the HARQ-ACK of the downlink transmission on the PUCCH resource.

11. The terminal according to claim 10, wherein the PUCCH is transmitted using a beam corresponding to the TRP or the TRP group corresponding to the downlink transmission.

12. The terminal according to claim 10, wherein the processor is further configured to execute the computer program to:
identify first information corresponding to the downlink transmission, wherein the first information comprises at least one of following: a format of Downlink Control Information (DCI) for scheduling the downlink transmission, a size of the DCI for scheduling the downlink transmission, a Radio Network Temporary Identifier (RNTI) corresponding to the downlink transmission, a Control Resource Set (CORESET)/a search space/a monitoring occasion where the DCI for scheduling the downlink transmission is located, an indication field in the DCI for scheduling the downlink transmission, a beam/Demodulation Reference Signal (DMRS) port for the downlink transmission, and a beam/DMRS port for the DCI for scheduling the downlink transmission; and
determine the TRP or the TRP group corresponding to the downlink transmission according to correspondence relationship between the first information and a TRP or a TRP group.

13. The terminal according to claim 10, wherein, the processor is further configured to execute the computer program to:

if the group of PUCCH resource sets corresponding to the TRP or the TRP group corresponding to the downlink transmission comprises only one PUCCH resource set, then according to the DCI corresponding to the downlink transmission, determine, in the PUCCH resource set, the PUCCH resource for transmitting the HARQ-ACK of the downlink transmission;
if the group of PUCCH resource sets corresponding to the TRP or the TRP group corresponding to the downlink transmission comprises at least two PUCCH resource sets, then select one PUCCH resource set according to the number of UCI bits to be fed back, and determine, in the selected one PUCCH resource set according to the DCI corresponding to the downlink transmission, the PUCCH resource for transmitting the HARQ-ACK of the downlink transmission;
or,
the processor is further configured to execute the computer program to:
if the configuration signaling configures only one PUCCH resource set, then according to preset correspondence relationship between a TRP or a TRP group and a PUCCH resource in the one PUCCH resource set, determine, in the PUCCH resource set, one or more PUCCH resources corresponding to the TRP or the TRP group corresponding to the downlink transmission as candidate PUCCH resources, and according to the DCI corresponding to the downlink transmission, determine, from the candidate PUCCH resources, the PUCCH resource for transmitting the HARQ-ACK of the downlink transmission;
if the configuration signaling configures at least two PUCCH resource sets, then select one PUCCH resource set according to the number of UCI bits to be fed back, and according to preset correspondence relationship between a TRP or a TRP group and a PUCCH resource in the selected one PUCCH resource set, determine, in the selected one PUCCH resource set, one or more PUCCH resources corresponding to the TRP or the TRP group corresponding to the downlink transmission as candidate PUCCH resources, and according to the DCI corresponding to the downlink transmission; determine, from the candidate PUCCH resources, the PUCCH resource for transmitting the HARQ-ACK of the downlink transmission.

14. The terminal according to claim 10, wherein,
PUCCH resources corresponding to different TRPs or TRP groups do not overlap in time domain;
or,
PUCCH resources corresponding to different TRPs or TRP groups overlap in time domain, the processor is further configured to execute the computer program to select a PUCCH for HARQ-ACK transmission based on a preset condition.

15. A network device, comprising a transceiver, a storage, a processor and a computer program stored on the storage and executable by the processor;
the transceiver is configured to send information and/or receive information under a control of the processor,
the processor is configured to execute the computer program to implement the information transmission method according to claim 6 through the transceiver.

16. The network device according to claim 15, wherein, receiving the HARQ-ACK of the downlink transmission through the PUCCH based on the TRP or the TRP group corresponding to the downlink transmission further comprises:

receiving, through the transceiver, the HARQ-ACK of the downlink transmission through the PUCCH based on the TRP or the TRP group corresponding to the downlink transmission, the PUCCH being transmitted using a beam corresponding to the TRP or the TRP group corresponding to the downlink transmission.

17. The network device according to claim 15, wherein, the processor is further configured to execute the computer program to:

if the group of PUCCH resource sets corresponding to the TRP or the TRP group corresponding to the downlink transmission comprises only one PUCCH resource set, then according to DCI corresponding to the downlink transmission, determine, in the PUCCH resource set, the PUCCH resource for carrying the HARQ-ACK of the downlink transmission;

if the group of PUCCH resource sets corresponding to the TRP or the TRP group corresponding to the downlink transmission comprises at least two PUCCH resource sets, then select one PUCCH resource set according to the number of UCI bits to be fed back, and determine, in the selected one PUCCH resource set according to DCI corresponding to the downlink transmission, the PUCCH resource for carrying the HARQ-ACK of the downlink transmission; or, the processor is further configured to execute the computer program to:

if the configuration signaling configures only one PUCCH resource set, then according to preset correspondence relationship between a TRP or a TRP group and a PUCCH resource in the one PUCCH resource set, determine, in the PUCCH resource set, one or more PUCCH resources corresponding to the TRP or the TRP group corresponding to the downlink transmission as candidate PUCCH resources, and according to DCI corresponding to the downlink transmission, determine, from the candidate PUCCH resources, the PUCCH resource for carrying the HARQ-ACK of the downlink transmission;

if the configuration signaling configures at least two PUCCH resource sets, then select one PUCCH resource set according to the number of UCI bits to be fed back, and according to preset correspondence relationship between a TRP or a TRP group and a PUCCH resource in the selected one PUCCH resource set, determine, in the selected one PUCCH resource set, one or more PUCCH resources corresponding to the TRP or the TRP group corresponding to the downlink transmission as candidate PUCCH resources, and according to the DCI corresponding to the downlink transmission; determine, from the candidate PUCCH resources, the PUCCH resource for carrying the HARQ-ACK of the downlink transmission.

18. The network device according to claim 16, wherein, PUCCH resources corresponding to different TRPs or TRP groups do not overlap in time domain;

or,

PUCCH resources corresponding to different TRPs or TRP groups overlap in time domain, the processor is further configured to execute the computer program to select one PUCCH for HARQ-ACK reception based on a preset condition.

* * * * *